(12) United States Patent
Park

(10) Patent No.: US 12,061,373 B2
(45) Date of Patent: Aug. 13, 2024

(54) LENS DRIVING DEVICE, AND CAMERA MODULE AND OPTICAL DEVICE INCLUDING SAME

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1010 days.

(21) Appl. No.: 16/978,499

(22) PCT Filed: Mar. 14, 2019

(86) PCT No.: PCT/KR2019/002944
§ 371 (c)(1),
(2) Date: Sep. 4, 2020

(87) PCT Pub. No.: WO2019/177390
PCT Pub. Date: Sep. 19, 2019

(65) Prior Publication Data
US 2020/0400916 A1    Dec. 24, 2020

(30) Foreign Application Priority Data

Mar. 15, 2018 (KR) .................. 10-2018-0030095

(51) Int. Cl.
*G02B 7/09* (2021.01)
*H02K 11/215* (2016.01)
(Continued)

(52) U.S. Cl.
CPC ............ *G02B 7/09* (2013.01); *H02K 11/215* (2016.01); *H02K 11/33* (2016.01);
(Continued)

(58) Field of Classification Search
CPC ... G02B 7/09; G02B 7/08; G02B 7/02; G02B 7/04; G02B 7/102; G02B 7/026;
(Continued)

(56) References Cited

U.S. PATENT DOCUMENTS

2012/0229901 A1* 9/2012 Moriya ................. H04N 23/68
359/557
2016/0187671 A1 6/2016 Park et al.
(Continued)

FOREIGN PATENT DOCUMENTS

CN        102436051 A     5/2012
CN        105988177 A     10/2016
(Continued)

OTHER PUBLICATIONS

English translation of KR 20180000964. (Year: 2018).*

*Primary Examiner* — Jie Lei
(74) *Attorney, Agent, or Firm* — Birch, Stewart, Kolasch & Birch, LLP

(57) ABSTRACT

An embodiment comprises: a housing; a bobbin arranged in the housing; a first coil arranged at a first side part of the bobbin; a second coil arranged at a second side part positioned on the side opposite to the first side part of the bobbin; a first magnet facing the first coil and arranged in the housing; a second magnet facing the second coil and arranged in the housing; a first elastic member coupled to the bobbin; a second elastic member comprising a first elastic unit and a second elastic unit coupled to the bobbin; and a circuit board arranged in the housing and having first and second terminals, wherein one end of the first coil is coupled to one area of the first elastic member and the other end of the first coil is coupled to the first elastic unit, one end of the second coil is coupled to another one area of the first elastic member and the other end of the second coil is coupled to the second elastic unit, the first elastic unit is connected to the first terminal of the circuit board, and the second elastic unit is connected to the second terminal of the circuit board.

19 Claims, 16 Drawing Sheets

(51) Int. Cl.
*H02K 11/33* (2016.01)
*H02K 41/035* (2006.01)
*G03B 13/36* (2021.01)

(52) U.S. Cl.
CPC ......... *H02K 41/0356* (2013.01); *G03B 13/36* (2013.01); *H02K 2211/03* (2013.01)

(58) Field of Classification Search
CPC ...... G02B 27/64; G02B 27/646; G02B 27/46; G03B 5/00; G03B 5/02; G03B 5/04; G03B 13/36; G03B 17/12; G03B 30/00; G03B 3/10; G03B 2205/00; G03B 2205/0007; G03B 2205/0015; G03B 2205/0069; G03B 2217/005; H02K 11/215; H02K 11/33; H02K 41/035; H02K 41/0356; H02K 2211/03
USPC ....... 359/823, 824, 557, 554, 813, 814, 819; 396/52–54
See application file for complete search history.

(56) References Cited

U.S. PATENT DOCUMENTS

| 2016/0259144 A1 | 9/2016 | Lee et al. |
| 2017/0176710 A1 | 6/2017 | Peng et al. |
| 2018/0017842 A1 | 1/2018 | Hsu et al. |
| 2018/0210163 A1* | 7/2018 | Jung ........................ G02B 7/08 |

FOREIGN PATENT DOCUMENTS

| EP | 3 264 161 A1 | 1/2018 | |
| JP | 2005-275269 A | 10/2005 | |
| JP | 2012-73478 A | 4/2012 | |
| JP | 2018-13782 A | 1/2018 | |
| KR | 10-2007-0116356 A | 12/2007 | |
| KR | 10-2012-0066264 A | 6/2012 | |
| KR | 10-2013-0053740 A | 5/2013 | |
| KR | 10-2016-0082035 A | 7/2016 | |
| KR | 10-2018-0000964 A | 1/2018 | |
| WO | WO-2017018727 A1 * | 2/2017 | ........... G02B 27/646 |

* cited by examiner

LENS DRIVING DEVICE, AND CAMERA MODULE AND OPTICAL DEVICE INCLUDING SAME

CROSS REFERENCE TO RELATED APPLICATIONS

This application is the National Phase of PCT/KR2019/002944 filed on Mar. 14, 2019, which claims priority under 35 U.S.C. § 119(a) to Patent Application No. 10-2018-0030095 filed in the Republic of Korea on Mar. 15, 2018, all of which are hereby expressly incorporated by reference into the present application.

TECHNICAL FIELD

Embodiments relate to a lens moving apparatus and a camera module and an optical device including the same.

BACKGROUND ART

It is difficult to apply technology of a voice coil motor (VCM) used in existing general camera modules to a subminiature, low-power camera module, and therefore research related thereto has been actively conducted.

In the case of a camera module configured to be mounted in a small electronic product, such as a smart phone, the camera module may frequently receive shocks during use, and may undergo fine shaking due to, for example, the shaking of a user's hand. In consideration thereof, technology enabling a device for preventing handshaking to be additionally installed to a camera module is being developed.

DISCLOSURE

Technical Problem

Embodiments provide a lens moving apparatus and a camera module and an optical device each including the same, which are capable of reducing magnetic-field interference, increasing electromagnetic force, preventing disconnection of first and second coils and preventing the first and second coils from being separated from a bobbin.

Technical Solution

A lens moving apparatus according to an embodiment includes a housing, a bobbin disposed in the housing, a first coil disposed on a first side portion of the bobbin, a second coil disposed on a second side portion of the bobbin, which is positioned opposite the first side portion of the bobbin, a first magnet disposed on the housing so as to face the first coil, a second magnet disposed on the housing so as to face the second coil, a first elastic member coupled to the bobbin, a second elastic member including a first elastic unit and a second elastic unit, which are coupled to the bobbin, and a circuit board disposed on the housing and including first and second terminals, wherein the first coil is coupled at a first end thereof to a first region of the first elastic member and at a second end thereof to the first elastic unit, wherein the second coil is coupled at a first end thereof to a second region of the first elastic member and at a second end thereof to the second elastic unit, and wherein the first elastic unit is connected to the first terminal of the circuit board, and the second elastic unit is connected to the second terminal of the circuit board.

The first elastic member may include a first frame, which is coupled to the bobbin and is conductively connected to the first end of the first coil and the first end of the second coil, the first elastic unit may include a second frame, which is disposed on the first side portion of the bobbin and is connected to the second end of the first coil, and the second elastic unit may include a third frame, which is disposed on the second side portion of the bobbin and is connected to the second end of the second coil.

The first side portion of the bobbin may be provided at a side surface thereof with at least one first protrusion to which the first coil is coupled, and the second side portion of the bobbin may be provided at a side surface thereof with at least one second protrusion to which the second coil is coupled.

The first coil may include a first portion, a second portion disposed under the first portion, a third portion connecting a first end of the first portion to a first end of the second portion, a fourth portion connecting a second end of the first portion to a second end of the second portion, a first connecting line connecting the first portion to a first region of the first elastic member, and a second connecting line connecting the second portion to the first elastic unit.

The second coil may include a first portion, a second portion disposed under the first portion, a third portion connecting a first end of the first portion to a first end of the second portion, a fourth portion connecting a second end of the first portion to a second end of the second portion, a third connecting line connecting the first portion to a second region of the first elastic member, and a fourth connecting line connecting the second portion to the second elastic unit.

The bobbin may include third and fourth side portions disposed between the first side portion and the second side portion, the third and fourth side portions not overlapping the first and second coils in a direction toward the fourth side portion from the third side portion of the bobbin, and the housing may further include a first side portion corresponding to the first side portion of the bobbin, a second side portion corresponding to the second side portion of the bobbin, and third and fourth side portions disposed between the first side portion and the second side portion of the housing, the third and fourth side portions of the housing not overlapping the first and second magnets in a direction toward the fourth side portion from the third side portion of the housing.

The lens moving apparatus may further include a sensing magnet disposed on the fourth side portion of the bobbin, and a position sensor disposed on the circuit board so as to face the sensing magnet, and the circuit board may be disposed on the fourth side portion of the housing.

The position sensor may include a hall sensor and a driver, the circuit board being conductively connected to the position sensor, and the position sensor may provide the first and second elastic units with a drive signal for driving the coil via the first and second terminals.

The first elastic member may be coupled to an upper portion of the bobbin, and the first and second elastic units may be coupled to a lower portion of the bobbin.

The first elastic member may be coupled to a lower portion of the bobbin, and the first and second elastic units may be coupled to an upper portion of the bobbin.

Advantageous Effects

Embodiments are able to reduce magnetic-field interference, increase electromagnetic force, prevent disconnection of first and second coils and prevent the first and second coils from being separated from a bobbin.

BEST MODE

Figure 1:
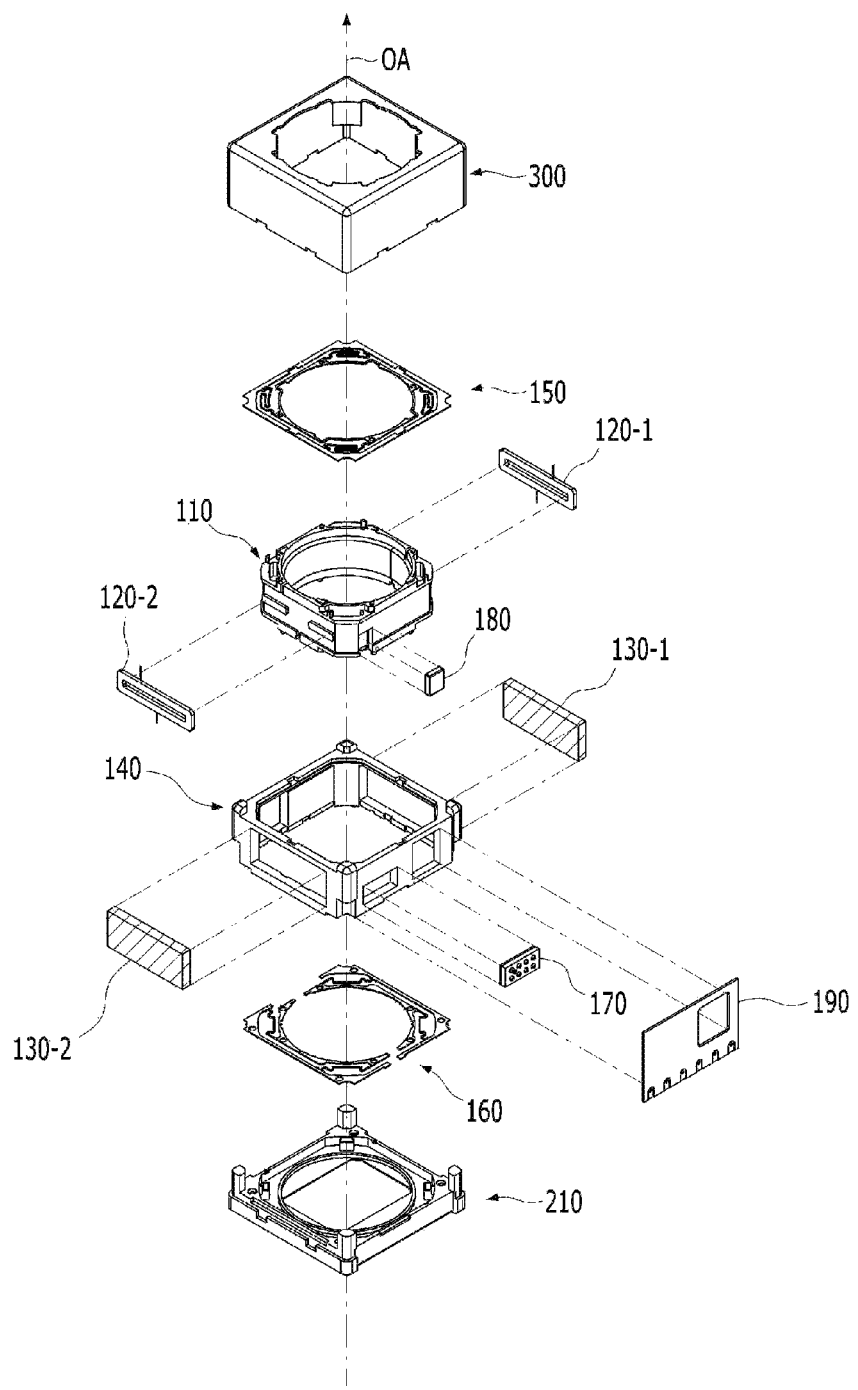
FIG. 1 is an exploded perspective view of a lens moving apparatus according to an embodiment.

Hereinafter, embodiments of the present invention capable of concretely achieving the above objects will be described with reference to the accompanying drawings.

In the following description of the embodiments, it will be understood that, when an element is referred to as being formed "on" or "under" another element, it can be directly "on" or "under" the other element, or can be indirectly disposed relative thereto, with one or more intervening elements therebetween. In addition, it will also be understood that "on" or "under" the element may mean an upward direction or a downward direction based on the element.

In addition, relative terms such as, for example, "first", "second", "on/upper/above" and "beneath/lower/below", used in the following description, may be used to distinguish any one substance or element from another substance or element without requiring or implying any physical or logical relationship or sequence between these substances or elements. The same reference numeral designates the same element throughout all of the drawings.

Unless otherwise defined, the terms "comprise," "include" or "have" used in the above description are used to designate the presence of features, steps or combinations thereof described in the specification, and should be understood as not excluding the presence or probability of additional inclusion of one or more different features, steps or combinations thereof. Furthermore, the term "correspond" or the like may include at least one of the meanings of "face" and "overlap".

For the convenience of description, although the lens moving apparatus according to an embodiment is described using a Cartesian coordinate system (x, y, z), the lens moving apparatus may be described using some other coordinate systems, and the embodiments are not limited thereto. In the respective drawings, the X-axis direction and the Y-axis direction mean directions perpendicular to an optical axis, i.e. the Z-axis. The Z-axis direction, which is the optical-axis direction or is a direction parallel to the optical axis, may be referred to as a "first direction", the X-axis direction may be referred to as a "second direction", and the Y-axis direction may be referred to as a "third direction".

The "auto-focusing function" serves to automatically focus an image of a subject on an image sensor surface. The lens moving apparatus according to an embodiment may move an optical module, which is constituted of at least one lens, in the first direction, so as to perform auto-focusing.

Figure 2:
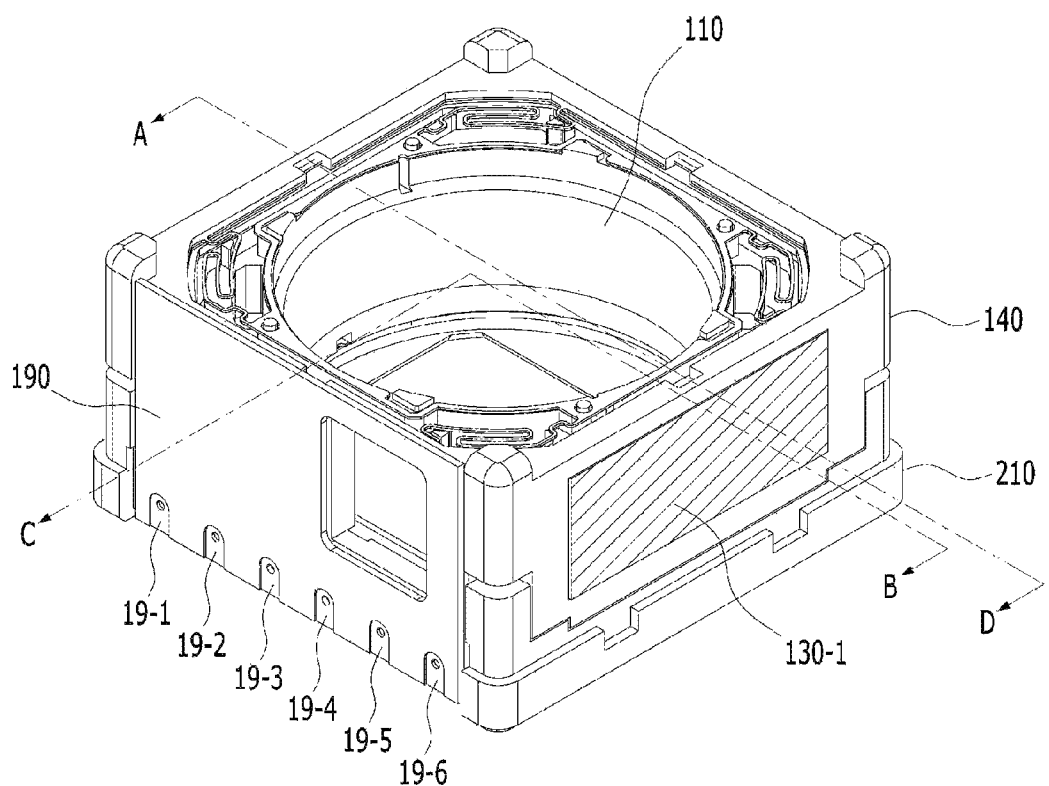
FIG. 2 is an assembled perspective view of the lens moving apparatus, from which a cover member is removed.

FIG. 1 is an exploded perspective of the lens moving apparatus 100 according to an embodiment of the present invention. FIG. 2 is an assembled perspective view of the lens moving apparatus 100, from which a cover member 300 is removed.

Referring to FIGS. 1 and 2, the lens moving apparatus 100 includes a bobbin 110, a first coil 120-1, a second coil 120-2, a first magnet 130-1, a second magnet 130-2, a housing 140, an upper elastic member 150 and a lower elastic member 160.

The lens moving apparatus 100 may further include a position sensor 170, a circuit board 190 and a third magnet 180 for AF feedback operation.

The lens moving apparatus 100 may further include a fourth magnet (not shown).

The lens moving apparatus 100 may further include a cover member 300 and a base 210.

First, the bobbin 110 will be described.

The bobbin 110 may be disposed in the housing 140 so as to be movable in the optical-axis direction OA or the first direction (for example, the Z-axis direction) by the electromagnetic interaction between the first and second coils 120-1 and 120-2 and the first and second magnets 130-1 and 130-2.

Figure 3:
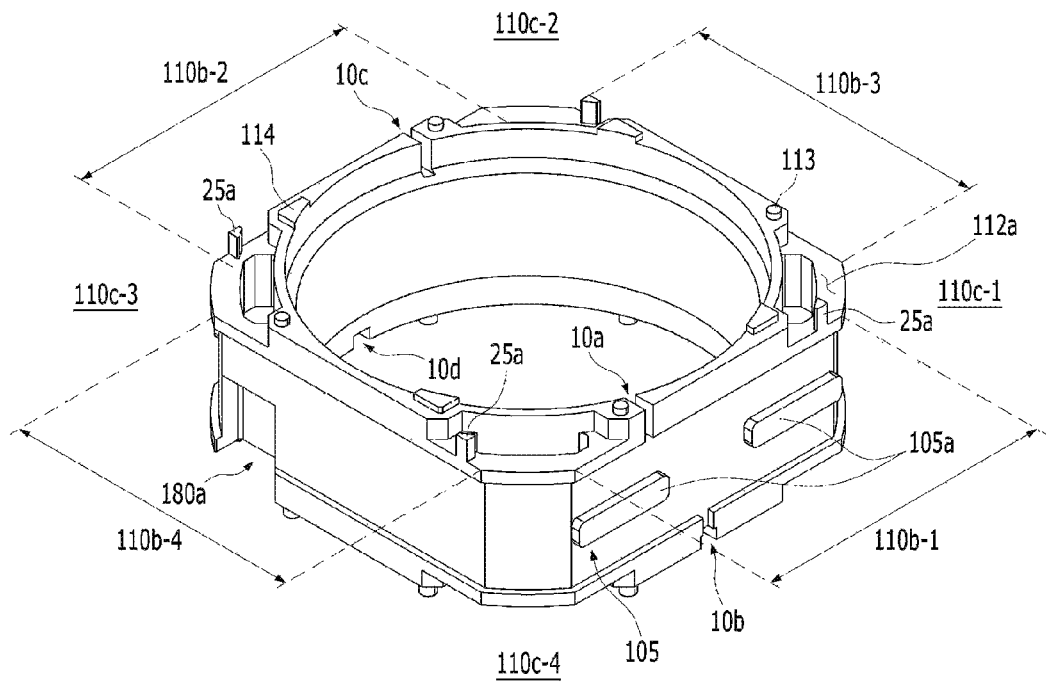
FIG. 3 is a perspective view of the bobbin shown in FIG. 1.
Figure 4:
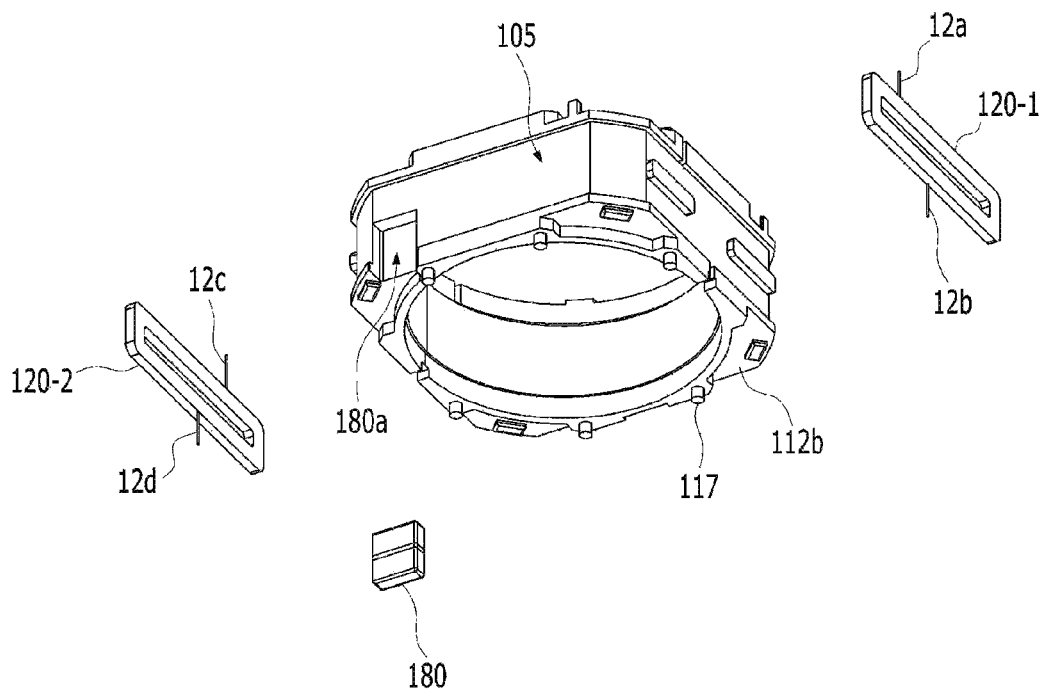
FIG. 4 is a view illustrating the bobbin, the first and second coils, and the third magnet, which are shown in FIG. 1.

FIG. 3 is a perspective view of the bobbin 110 shown in FIG. 1. FIG. 4 is a view illustrating the bobbin 110, the first and second coils 120-1 and 120-2, and the third magnet 180, which are shown in FIG. 1.

Referring to FIGS. 3 and 4, a lens or a lens barrel may be mounted in the bobbin 110, and the bobbin 110 may be disposed in the housing 140.

The bobbin 110 may have a bore configured to allow a lens or a lens barrel to be mounted therein.

For example, the bore in the bobbin 110 may be a through hole, and may have a circular shape, an elliptical shape, or a polygonal shape, without being limited thereto.

The bobbin 110 may include a first coupler 113, which is disposed on the upper surface thereof and is coupled or secured to the first inner frame 151 of the upper elastic member 150, and a second coupler 117, which is disposed on the lower surface thereof and is coupled or secured to the second inner frame 161 of the lower elastic member 160.

Although each of the first and second couplers 113 and 117 is illustrated in FIGS. 3 and 4 as being configured to have the form of a protrusion, the disclosure is not limited thereto. In another embodiment, each of the first and second couplers 113 and 117 may have the form of a groove or a flat surface.

The bobbin 110 may have a first escape groove 112a formed in a region of the upper surface thereof that corresponds to or is aligned with the first frame connector 153 of the upper elastic member 150 in the optical-axis direction.

Furthermore, the bobbin 110 may have a second escape groove 112b formed in a region of the lower surface thereof that corresponds to or is aligned with the second frame connector 163 of the lower elastic member 160 in the optical-axis direction.

By virtue of the first escape groove 112a and the second escape groove 112b in the bobbin 110, when the bobbin 110 is moved in the first direction, the spatial interference between the first frame connector 153 and the second frame connector 163 and the bobbin 110 is eliminated, thereby allowing the first frame connector 153 and the second frame connector 163 to be elastically deformed with ease.

The bobbin 110 may include a damper protrusion 25a for guiding a damper disposed between the first frame connector 153 of the upper elastic member 150 and the bobbin.

For example, the damper protrusion 25a may project in the optical-axis direction from the bottom surface of the escape groove 112a in the bobbin 110. Based on the bottom surface of the escape groove 112a, the height of the upper surface of the damper protrusion 25a may be lower than the height of the lower surface of the first frame connector 153. Although four first escape grooves and four damper protrusions are illustrated in FIG. 3, the disclosure is not limited thereto.

The bobbin 110 may include a plurality of side surfaces or outer surfaces.

The bobbin 110 may include side portions 110b-1 to 110b-4 and corner portions 110c-1 to 110c-4. Each of the first to fourth corner portions of the bobbin 110 may be disposed between two adjacent side portions of the bobbin 110.

The side surfaces or outer surfaces of the first to fourth side portions 110b-1 to 110b-4 of the bobbin 110 may be referred to as "first to fourth side surfaces" or "first to fourth outer surfaces".

For example, the surface area of the side surface or outer surface of each of the first to fourth corner portions 110c-1 to 110c-4 may be smaller than the surface area of the side surface or outer surface of each of the first to fourth side portions 110b-1 to 110b-4. For example, the horizontal length of the side surface or outer surface of each of the first to fourth corner portions 110c-1 to 110c-4 may be less than the horizontal length of the side surface or outer surface of each of the first to fourth side portions 110b-1 to 110b-4.

For stable seating of the first and second coils 120-1 and 120-2, the bobbin 110 may have therein grooves, which are respectively formed in two side portions (for example, 110b-1 and 110b-2) that face each other.

Each of the two side portions (for example, 110b-1 and 110b-2 of the bobbin 110, which face each other, may be provided with at least one protrusion 105a, around or to which the first or second coil is wound or secured.

For example, the protrusion 105a may project from the bottom surface of the groove 105 in the bobbin 110 in a direction perpendicular to the optical axis.

The number of protrusions is one or more. For example, each of the two side portions (for example, 110b-1 and 110b-2) of the bobbin 110 may include two protrusions, which are spaced apart from each other.

For stable seating of the third magnet 180, the bobbin 110 may have a groove 180a formed in the outer surface of one of the side portions (for example, 110b-4).

The bobbin 110 may have a groove formed in the outer surface of the side portion facings the side portion 110b-4 having the groove 180a formed therein, so as to receive a fourth magnet (not shown) therein.

The bobbin 110 may include a first stopper 114, which projects upwards from the upper surface thereof, and a second stopper (not shown), which projects downwards from the lower surface thereof. The first stopper 114 and the second stopper of the bobbin 110 may serve to prevent the upper surface or the lower surface of the bobbin 110 from directly colliding with the inner surface of the cover member 300 or the upper surface of the base 210 when the bobbin 110 is moved beyond a specified range due to an external impact or the like while the bobbin 110 is being moved in the first direction to perform auto-focusing.

Next, the first coil 120-1 and the second coil 120-2 will be described.

The first coil 120-1 may be disposed on the first side portion 110b-1 of the bobbin 110, and the second coil 120-2 may be disposed on the second side portion 110b-2 of the bobbin 110.

For example, the first coil 120 may be disposed on the first side surface or outer surface of the bobbin 120, and the second coil 120-2 may be disposed on the second side surface or outer surface of the bobbin 110, which faces the first side surface of the bobbin 110.

The third side surface and the fourth side surface of the bobbin 110 may not overlap the first and second coils 120-1 and 120-2 in a direction toward the fourth side surface (or the fourth outer surface) of the bobbin 110 from the third side surface (or the third outer surface) of the bobbin 110.

The first coil 120-1 and the second coil 120-2 may be drive coils for moving the bobbin 110 by the electromagnetic interaction between the first and second coils and the first and second magnets 130-1 and 130-2.

In order to create electromagnetic force as a result of the interaction between the first and second coils and the first and second magnets 130-1 and 130-2, a drive signal (for example, a drive current or voltage) may be applied to the first and second coils 120-1.

For example, the drive signal applied to the first and second coils 120-1 and 120-2 may be a DC signal.

In another embodiment, for example, the drive signal applied to the first and second coils 120-1 and 120-2 may include an AC signal and a DC signal.

The AF operation unit may be driven unidirectionally or bidirectionally by the electromagnetic force resulting from the interaction between the first and second coils 120-1 and 120-2 and the first and second magnets 130-1 and 130-2. Here, unidirectional driving means that the AF operation unit is moved in one direction, for example, in an upward direction (for example, in a +z-axis direction) from the initial position of the AF operation unit, and bidirectional driving means that the AF operation unit is moved in two directions (for example, in upward and downward directions) based on the initial position of the AF operation unit.

For example, the initial position of the bobbin 110 may be the original position of the AF operation unit (for example, the bobbin) in the state in which no electric power or drive signal is applied to the first and second coils 120-1 and 120-2, or the position at which the AF operation unit is located as the result of the upper and lower elastic members 150 and 160 being elastically deformed due only to the weight of the AF operation unit.

In addition, the initial position of the bobbin 110 may be the position at which the AF operation unit is located when gravity acts in the direction from the bobbin 110 to the base 210 or when gravity acts in the direction from the base 210 to the bobbin 110.

Here, the AF operation unit may include the bobbin 110, which is elastically supported by the upper elastic member 150 and the lower elastic member 160, and the components which are mounted on the bobbin 110 and are moved therewith. For example, the AF operation unit may include the bobbin 110, the first and second coils 120-1 and 120-2 and the third magnet 180. For example, the AF operation unit may further include a lens (not shown) mounted on the bobbin 110.

By controlling the intensity and/or polarity (for example, the direction in which current flows) of the drive signal applied to the first and second coils 120-1 and 120-2 and thus controlling the intensity and/or direction of the electromagnetic force resulting from the interaction between the first and second coils 120-1 and 120-2 and the first and second magnets 130-1 and 130-2, it is possible to control the movement of the AF operation unit and it is therefore possible to perform an auto-focusing function.

The first coil 120-1 may be wound or secured around the protrusion 105 provided at the first side portion 110b-1 of the bobbin 110 in a direction perpendicular to the optical axis so as to have a closed loop shape, and the second coil 120-2 may be wound or secured around the protrusion 105 provided at the second side portion 110b-2 of the bobbin 110 so as to have a closed loop shape.

For example, the first coil 120-1 may be wound around an axis perpendicular to the outer surface of the first side portion 110b-1 of the bobbin 110 in a clockwise direction or in a counterclockwise direction so as to have a ring shape.

Furthermore, the second coil 120-1 may be wound around an axis perpendicular to the outer surface of the second side portion 110b-2 of the bobbin 110 in a clockwise direction or in a counterclockwise direction so as to have a ring shape.

In another embodiment, each of the first coil 120-1 and the second coil 120-2 may be embodied as a coil ring, in which the coil-ring-shaped first coil 120-1 may be attached or secured to the outer surface of the first side portion of the bobbin 110 using an adhesive member, and the coil-ring-shaped second coil 120-2 may be attached or secured to the second side portion 110b-2 of the bobbin using an adhesive member.

Next, the housing 140 will be described.

The housing 140 accommodates therein the bobbin 110 at which the first and second coils 120-1 and 120-2 and the third magnet 180 are disposed.

Figure 5:
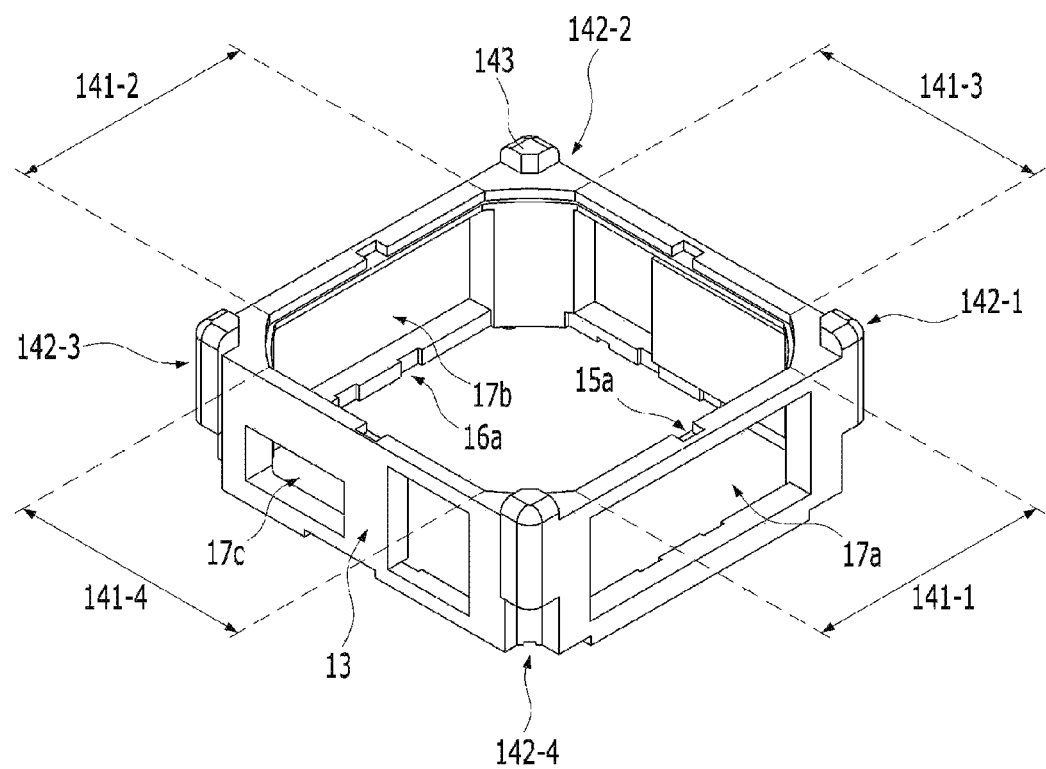
FIG. 5 is a perspective view of the housing shown in FIG. 1.
Figure 6:
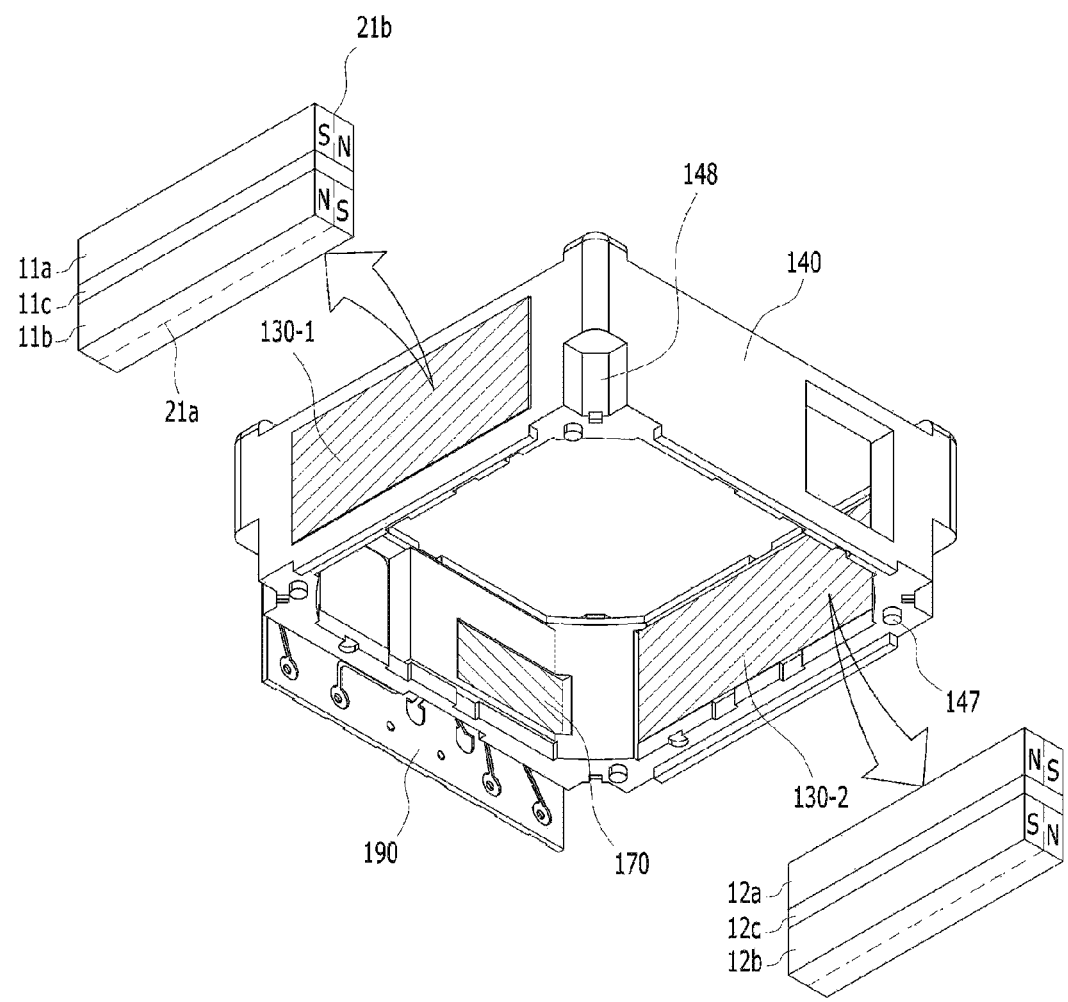
FIG. 6 is a perspective view of the housing to which first and second magnets, a circuit board and a position sensor are coupled.

FIG. 5 is a perspective view of the housing 140 shown in FIG. 1. FIG. 6 is a perspective view of the housing 140 to which the first and second magnets 130-1 and 130-2, the circuit board 190, and the position sensor 170 are coupled.

Referring to FIGS. 5 and 6, the housing 140 supports the first and second magnets 130-1 and 130-2, and accommodates therein the bobbin 110 such that the bobbin 110 is movable in the optical-axis direction.

The housing 140 may have a column shape having a bore for receiving therein the bobbin 110. The housing 140 may include a plurality of side portions (for example, 141-1 to 141-4) and a plurality of corner portions (for example, 142-1 to 142-4), which collectively define the bore.

For example, the housing 140 may include the side portions (for example, 141-1 to 141-4) and the corner portions (for example, 142-1 to 142-4), which collectively define the bore having a polygonal shape (for example, a square shape or an octagonal shape) or a circular shape.

For example, the housing 140 may include the first to fourth side portions 141-1 to 141-4, which are spaced apart from one another, the first corner portion 142-1 positioned between the first side portion 141-1 and the third side portion 141-3, the second corner portion 142-2 positioned between the second side portion 141-2 and the third side portion 141-3, the third corner portion 142-3 positioned between the second side portion 141-2 and the fourth side portion 141-4, and the fourth corner portion 142-4 positioned between the fourth side portion 141-4 and the first side portion 141-1.

The third side portion 141-3 and the fourth side portion 141-4 of the housing 140 may be disposed between the first side portion 141-2 and the second side portion 141-2 of the housing 140.

The housing 140 may include a first side surface (or a first outer surface corresponding to the first side surface (or the first outer surface) of the bobbin 110, a second side surface (or a second outer surface) corresponding to the second side surface (or the second outer surface) of the bobbin 110, a third side surface (or a third outer surface) corresponding to the third side surface (or the third outer surface) of the bobbin 110, and a fourth side surface (or a fourth outer surface) corresponding to the fourth side surface (or the fourth outer surface) of the bobbin 110. The third and fourth side surfaces (or the third and fourth outer surfaces) of the housing 140 may be disposed between the first and second side surfaces (or the first and second outer surfaces) of the housing 140.

For example, each of the first to fourth side surfaces (or the first to fourth outer surfaces) of the housing 140 may be one side surface or outer surface of a corresponding one among the first to fourth side portions 141-1 to 141-4 of the housing 140.

Each of the first to fourth side portions 141-1 to 141-4 of the housing 140 may be disposed parallel to a corresponding one among the side plates of the cover member 300.

Each of the first to fourth side portions 141-1 to 141-4 of the housing 140 may correspond to one of the first to fourth side portions 110b-1 to 110b-4 of the bobbin 110, and each of the first to fourth corner portions 142-1 to 142-4 of the housing 140 may correspond to one of the first to fourth corner portions 110c-1 to 110c-4 of the bobbin 110.

In order to mount the first and second magnets 130-1 and 130-2, the housing 140 may include a first seating portion 17a, formed in the outer surface of the first side portion 141-1 of the housing 140, and a second seating portion 17b, formed in the outer surface of the second side portion 141-2 of the housing 140.

Although each of the first and second seating portions 17a and 17b is illustrated in FIG. 5 as having a bore or a through hole, which is formed through the first or second side portion 141-1 or 141-2 of the housing 140, the disclosure is not limited thereto. In another embodiment, each of the first and second seating portions may have a groove or recess shape. In a further embodiment, each of the first and second seating portions may have a flat surface shape rather than a groove shape.

In order to prevent the housing 140 from colliding with the inner surface of the upper plate of the cover member 300, the housing 140 may be provided on the upper portion, the upper surface or the upper end thereof with a stopper 143.

Although the stopper 143 may be disposed, for example, on the upper surface of at least one of the first to fourth corner portions 142-1 to 142-4 of the housing 140, the disclosure is not limited thereto.

For coupling to a hole 152a in the first outer frame 152 of the upper elastic member 150, the housing 140 may include at least one first coupler (not shown) provided on the upper portion, the upper surface or the upper end thereof. The first coupler of the housing 140 may have a protrusion shape, a groove shape or a flat surface shape, without being limited thereto.

Furthermore, for coupling to a hole 162a in the second outer frame 162 of the lower elastic member 160, the housing 140 may include at least one second coupler 147 provided on the lower portion, the lower surface or the lower end of the housing 140. Although the second coupler 147 is illustrated in FIG. 6 as having a protrusion shape, the disclosure is not limited thereto. In another embodiment, the second coupler 147 may have a groove shape or a flat surface shape.

In order to prevent the lower surface or the bottom of the housing 140 from colliding with the base 210, which will be described later, the housing 140 may include at least one stopper (not shown) projecting from the lower portion, the lower surface or the lower end thereof.

The lower portion or the lower surface of at least one of the first to fourth corner portions 142-1 to 142-4 of the housing 140 may be provided therein with a guide groove 148 corresponding to a projection 216 of the base 210.

For example, the guide groove 148 in the housing 140 may be coupled to the projection 216 of the base 210 using an adhesive member, and the housing 140 may be coupled to the base 210 using an adhesive member.

In order to avoid spatial interference with a portion at which the first frame connector 153 of the upper elastic member 150 is connected to the first outer frame 151, the upper portion, the upper surface or the upper end of at least one of the first to fourth side portions 141-1 to 141-4 of the housing 140 may be provided therein at least one upper escape groove 15a.

Furthermore, in order to avoid spatial interference with a portion at which the second frame connector 163 of the lower elastic member 160 is connected to the second outer frame 161, the lower portion, the lower surface or the lower end of at least one of the first to fourth side portions 141-1 to 141-4 of the housing 140 may be provided therein with at least one lower escape groove 16a.

For seating the circuit board 190, the housing 140 may include a seating portion 13 provided on the outer surface of the fourth side portion 141-4. Although the seating portion 13 may have a groove shape depressed from the outer surfaces of the third and fourth corner portions, the disclosure is not limited thereto. In another embodiment, the seating portion 13 may have a flat surface shape.

For example, the circuit board 190 may be attached to the housing 140 using an adhesive, or may have a structure (for example, a protrusion or a groove) to be coupled to the housing.

For seating the position sensor 170, the housing 140 may include a sensor-seating portion 17c formed in the fourth side portion 141-4.

For example, the sensor-seating portion 17c may be disposed in the seating portion 13 in the housing 140.

Although the sensor-seating portion 17c is illustrated in FIG. 5 as having an opening or a through hole formed through the fourth side portion 141-4 of the housing 140, the disclosure is not limited thereto. In another embodiment, the sensor-seating portion may have a groove shape. Although the sensor-seating portion 17c may have a shape corresponding to or coinciding with the position sensor 190, the disclosure is not limited thereto.

Next, the first and second magnets 130-1 and 130-2 will be described.

The first and second magnets 130-1 and 130-2 may be magnets that are capable of generating electromagnetic force resulting from the interaction between the first and second coils 120-1 and 120-2 and thus of moving the bobbin 110 using the electromagnetic force.

The first magnet 130-1 and the second magnet 130-2 may be disposed on the side surface or the outer surface of the two facing side portions 141-1 and 141-2 of the housing 140.

For example, the first magnet 130-1 may be disposed on the first side surface or the first outer surface of the housing 140, and the second magnet 130-2 may be disposed on the second side surface or the second outer surface of the housing 140.

For example, the first side surface or the first outer surface of the housing 140 may be the side surface or the outer surface of the first side portion 141-1 of the housing 110, and the second side surface or the second outer surface of the housing 140 may be the side surface or the outer surface of the second side portion 141-2 of the housing 140.

The third and fourth side surfaces (or the third and fourth outer surfaces) of the housing 140 may be disposed between the first and second side surfaces (or the first and second outer surfaces) of the housing 140.

For example, the third side surface (or the third outer surface) of the housing 140 may be the side surface or the outer surface of the third side portion 141-3 of the housing 140, and the fourth side surface (or the fourth outer surface) of the housing 140 may be the side surface or the outer surface of the fourth side portion 141-4 of the housing 140.

For example, each of the first and second magnets 130-1 may be disposed on a corresponding one of the first seating portion 17a and the second seating portion 17b in the housing 140.

In another embodiment, the side portions 141-1 and 141-2 of the housing 140 may not be provided with the opening, and the first and second magnets 130-1 and 130-2 may be disposed on the outer surfaces of the side portions 141-1 and 141-2 of the housing 140.

Although each of the first and second magnets 130-1 and 130-2 may have a shape corresponding to the outer surfaces of the side portions 141-1 and 141-2 of the housing 140, for example, a rectangular parallelepiped shape, the disclosure is not limited thereto.

Each of the first and second magnets 130-1 and 130-2 may be a bipolar magnetized magnet divided into two parts in a direction perpendicular to the optical axis. Here, the first and second magnets 130-1 and 130-2 may be embodied by a ferrite magnet, an alnico magnet, a rare-earth magnet or the like.

Referring to FIG. 6, the first magnet 130-1 may include a first magnet part 11a, a second magnet part 11b and a "first nonmagnetic partition wall" 11c disposed between the first magnet part 11a and the second magnet part 11b.

The first magnet part 11a may include an N pole, an S pole and a first interface surface 21a between the N pole and the S pole. The first interface surface 21a may be a portion that has substantially no magnetism and has a zone having almost no polarity, and may be a portion which is naturally formed in order to form a magnet composed of one N pole and one S pole.

The second magnet part 11b may include an N pole, an S pole and a second interface 21b between the N pole and the S pole. The second interface 21b may be a portion that has substantially no magnetism and has a zone having almost no polarity, and may be a portion that is naturally formed in order to form a magnet composed of one N pole and one S pole.

The first nonmagnetic partition wall 11c may separate or isolate the first magnet part 11a and the second magnet part 11b from each other, and may be a portion having substantially no magnetism or polarity. For example, the first nonmagnetic partition wall 11c may be constituted by a nonmagnetic material, air or the like. The nonmagnetic partition wall may be considered a "neutral zone".

The first nonmagnetic partition wall 11c may be a portion that is artificially formed when the first magnet part 11a and the second magnet part 11b are magnetized, and the width of the first nonmagnetic partition wall 11c may be greater than the width of each of the first interface 21a and the second interface 21a. Here, the width of the first nonmagnetic partition wall 11c may be the length of the nonmagnetic partition wall 11c in a direction toward the second magnet part 11b from the first magnet part 11a.

For example, the width of the first nonmagnetic partition wall 11c may be 0.2 mm-0.5 mm. Specifically, the width of the first nonmagnetic partition wall 11c may be 0.3 mm-0.4 mm.

The first magnet part 11a and the second magnet part 11b may be disposed such that opposite poles thereof face each other in the optical-axis direction.

For example, the first magnet part 11a and the second magnet part 11b may be disposed such that the N pole of the first magnet part 11a and the S pole of the second magnet part 11b face the first coil 120-1. However, the disclosure is not limited thereto, and the reverse disposition is also possible.

The second magnet 130-2 may include a third magnet part 12a, a fourth magnet part 12b and a second nonmagnetic partition wall 12c disposed between the third magnet part 12a and the fourth magnet part 12b.

Each of the third magnet part 12a and the fourth magnet part 12b may include an interface between the N pole and the S pole.

The description of the first interface 21a of the first magnet part 11a may apply to the interface of each of the third magnet part 12a and the fourth magnet part 12b. Furthermore, the description of the first nonmagnetic partition wall 11c may apply to the second nonmagnetic partition wall 12c.

Each of the first nonmagnetic partition wall 11c and the second nonmagnetic partition wall 12c may extend in a horizontal direction, or in a direction perpendicular to the optical axis.

The first magnet part 11a, the first nonmagnetic partition wall 11c and the second magnet part 11b may be sequentially disposed in that order in the optical-axis direction. Furthermore, the third magnet part 12a, the second nonmagnetic partition wall 12c and the fourth magnet part 12b may be sequentially disposed in that order in the optical-axis direction.

For example, the first magnet part 11a may be disposed on the first nonmagnetic partition wall 11c, and the second magnet part 11b may be disposed beneath the first nonmagnetic partition wall 11c. Furthermore, the third magnet part 12a may be disposed on the second nonmagnetic partition wall 12c, and the fourth magnet part 12b may be disposed beneath the second nonmagnetic partition wall 12c.

For example, each of the first nonmagnetic partition wall 11c and the second nonmagnetic partition wall 12c may be parallel to a line perpendicular to the optical axis, and the interface 21a or 21b of each of the first and second magnet parts 11a and 11b may be parallel to the optical axis.

Next, the third magnet 180 will be described.

The third magnet 180 may be a sensing magnet.

The position sensor 180 may detect variation in the intensity of a magnetic field of the third magnet 180 due to movement of the bobbin 110.

The third magnet 180 may be disposed on one of the third and fourth side surfaces (or the third and fourth outer surfaces) of the bobbin 110.

For example, the third magnet 180 may be disposed on the fourth side surface (or the fourth outer surface) of the bobbin 110. For example, the third magnet 180 may be disposed in the sensor-seating portion 180a in the bobbin 110.

Although a portion of one surface of the third magnet 180 mounted in the third sensor-seating portion 180a in the bobbin 110 may project from the outer surface of the bobbin 110, the disclosure is not limited thereto. In another embodiment, the portion may not project from the outer surface of the bobbin 110.

The third magnet 180 may be a monopolar magnetized magnet, which is disposed such that the upper surface thereof has an N pole and the lower surface thereof has an S pole. However, the disclosure is not limited thereto, and the polarities may be disposed in the opposite manner.

For example, the third magnet 180 (and the fourth magnet) may be disposed such that the interface between the N pole and the S pole is parallel to a direction perpendicular to the optical axis. However, the disclosure is not limited thereto, and the interface between the N pole and the S pole may be parallel to the optical axis in another embodiment.

In another embodiment, the third magnet 180 may be a bipolar magnetized magnet. The bipolar magnetized magnet may include a first magnet part including an N pole and an S pole, a second magnet part including an N pole and an S pole, and a nonmagnetic partition wall disposed between the first magnet part and the second magnet part.

By virtue of the electromagnetic force resulting from the interaction between the first and second coils 120-1 and 120-2 and the first and second magnets 130-1 and 130-2, the magnet 180 may be moved together with the bobbin 110 in the optical-axis direction OA. At this time, the position sensor 170 may detect the intensity of the magnetic field of the third magnet 180, which is moved in the optical-axis direction, and may output an output signal corresponding to the detected intensity. For example, a controller 830 of a camera module 200 or a controller 780 of a terminal 200A may detect displacement of the bobbin 110 in the optical-axis direction based on the output signal output from the position sensor 170.

The lens moving apparatus 100 may further include the fourth magnet, which is disposed on the bobbin 110 so as to counteract the influence on the first and second coils 120-1 and 120-2 due to the magnetic field of the third magnet 180 and to attain weight equilibrium with respect to the AF operation unit. Here, the term "fourth magnet" may be interchangeably used with "balancing magnet".

For example, the fourth magnet may be disposed on the other of the third and fourth side surfaces (or the third and fourth outer surfaces) of the bobbin 110. For example, the fourth magnet 185 may be disposed on the third side surface (or the third outer surface) of the bobbin 110.

Next, the position sensor 170 and the circuit board 190 will be described.

The circuit board 190 and the position sensor 170 may be disposed on the third side surface or the fourth side surface of the housing 140, at which the first and second magnets 130-1 and 130-2 are not disposed.

For example, the circuit board 190 and the position sensor 170 may be disposed on the fourth side surface (or the fourth outer surface) of the housing 140 or the fourth side portion 141-4 of the housing 140. In another embodiment, the circuit board 190 may also be disposed on the third side surface (or the third outer surface) of the housing 140 or the third side portion (141-3).

For example, the circuit board 190 may be disposed in the seating portion 13 formed in the fourth side portion 141-1 of the housing 140. A first surface of the circuit board 190 may be in contact with the seating portion 13 in the housing 140.

The circuit board 190 may include a plurality of terminals 190-1 to 190-6, which are to be conductively connected to external components. Although the plurality of terminals 190-1 to 190-6 may be arranged in a line at the lower end of the second surface of the circuit board 190, the disclosure is not limited thereto. Here, the second surface of the circuit board 190 may be a surface opposite the first surface of the circuit board 190.

Although the circuit board 190 shown in FIG. 2 includes four terminals 190-1 to 190-6, the disclosure is not limited thereto.

The circuit board 190 may include a circuit pattern or a wire for conductively connecting the position sensor 190 to the terminals 190-1 to 190-6.

The position sensor 170 may be mounted or disposed on a first surface of the circuit board 190.

The position sensor 170 may be disposed on the sensor-seating portion 17c formed in the fourth side portion 141-4 of the housing 140.

At the initial position of the bobbin 110, the position sensor 170 disposed on the housing 140 may overlap the third magnet 180, disposed on the bobbin 110, in a direction toward the third side surface or the side portion 141-3 of the housing 140 from the fourth side surface or the fourth side portion 141-4 of the housing 140. However, the disclosure is not limited thereto.

In another embodiment, at the initial position of the bobbin 110, the position sensor 170 and the third magnet 180 may not overlap each other in a direction toward the third side surface or the third side portion of the housing 140 from the fourth side surface or the fourth side portion 141-4 of the housing 140.

At the initial position of the bobbin 110, the position sensor 170 disposed on the housing 140 may not overlap the first coil 120-1 or the second coil 120-2 in the direction of the third side surface or the third side portion 141-3 of the housing 140 from the fourth side surface or the fourth side portion 141-4 of the housing 140.

The sensor 170 disposed on the housing 140 may not overlap the first magnet 130-1 or the second magnet 130-2 in a direction toward the third side surface or the third side portion 141-3 of the housing 140 from the fourth side surface or the fourth side portion 141-4 of the housing 140.

The position sensor 170 may detect the intensity of the magnetic field of the third magnet 180 mounted on the bobbin 110, and may output the output signal (for example, the output voltage) corresponding to the detected intensity.

The position sensor 170 may be embodied as a hall sensor or a driver including a hall sensor.

Figure 15:
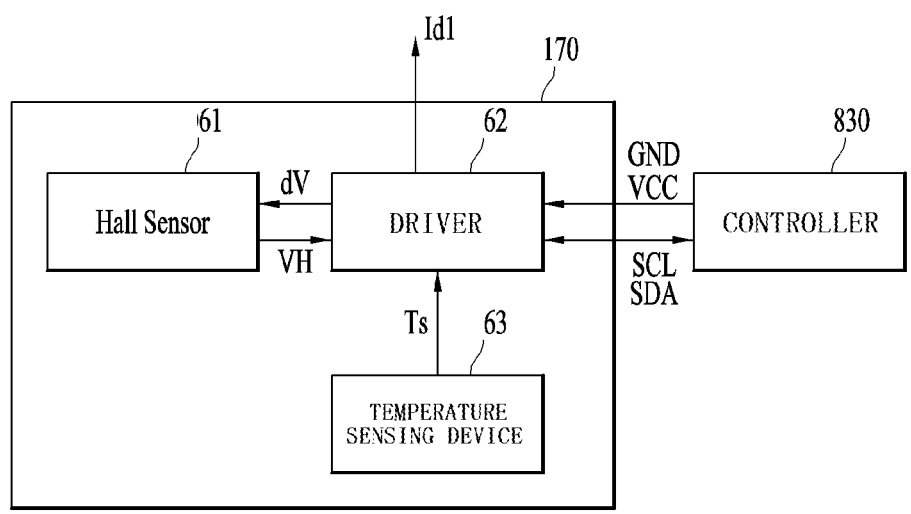
FIG. 15 is a view illustrating an embodiment of the position sensor shown FIG. 1.

FIG. 15 illustrates an embodiment of the position sensor 170 shown in FIG. 1.

Referring to FIG. 15, the position sensor 170 may include a hall sensor 61 and a driver 62.

For example, the hall sensor 61 may be made of silicone, and the output VH of the hall sensor 61 may increase as the ambient temperature increases. For example, the ambient temperature may be the temperature of the lens moving apparatus, for example, the temperature of the circuit board 190, the temperature of the hall sensor 61, or the temperature of the driver 62.

In another embodiment, the hall sensor 61 may be made of GaAs, and the output VH of the hall sensor 61 may have a slope of about −0.06%/° C. with respect to an ambient temperature.

The first position sensor 170 may further include a temperature-sensing element 63 capable of detecting an ambient temperature. The temperature-sensing element 63 may output a temperature detection signal Ts, corresponding to the result of detection of the ambient temperature around the first position sensor 170, to the driver 62.

For example, the hall sensor 61 of the first position sensor 190 may generate the output VH corresponding to the result of detection of the intensity of the magnetic force of the third sensing magnet 180.

The driver 62 may output a drive signal dV for driving the hall sensor 61 and a drive signal Id1 for driving the first coil 120.

For example, the driver 62 may receive a clock signal SCL, a data signal SDA, and power signals VCC and GND through data communication using a protocol such as I2C communication.

The driver 62 may create the clock signal SCL, the drive signal dV for driving the hall sensor 61 using the power signals VCC and GND, and the drive signal Id1 for driving the first coil 120.

The first position sensor 170 may include the first to fourth terminals for sending and receiving the clock signal SCL, the data signal SDA, the power signals VCC and GND, and the fifth and sixth terminals for providing a drive signal to the first coil 120.

The circuit board 190 may be conductively connected to the first to sixth terminals (not shown) of the first position sensor 170. The circuit board 190 may include a first terminal or a first connection terminal 91, which is conductively connected to the fifth terminal of the first position sensor 170, and a second terminal or a second connection terminal 92, which is conductively connected to the sixth terminal of the first position sensor 1870.

Furthermore, the driver 62 may receive the output VH of the hall sensor 61, and may send the clock signal SCL and the data signal SDA pertaining to the output VH of the hall sensor 61 through data communication using a protocol such as I2C communication.

Furthermore, the driver 62 may receive the temperature detection signal Ts as a result of detection by the temperature-sensing element 63, and may send the temperature detection signal Ts to controllers 830 and 780 through data communication using a protocol such as the I2C communication.

The controllers 830 and 780 may perform temperature compensation for the output VH from the hall sensor 61 based on variation in the ambient temperature detected by the temperature-sensing element 63 of the first position sensor 170.

The first position sensor 170 may include the first to third terminals for the clock signal SCL and the two power signals VCC and GND, the fourth terminal for the data SDA, and the fifth and sixth terminals for providing drive signals to the first and second coils 120-1 and 120-2.

Next, the upper elastic member 150 and the lower elastic member 160 will be described.

Figure 7:
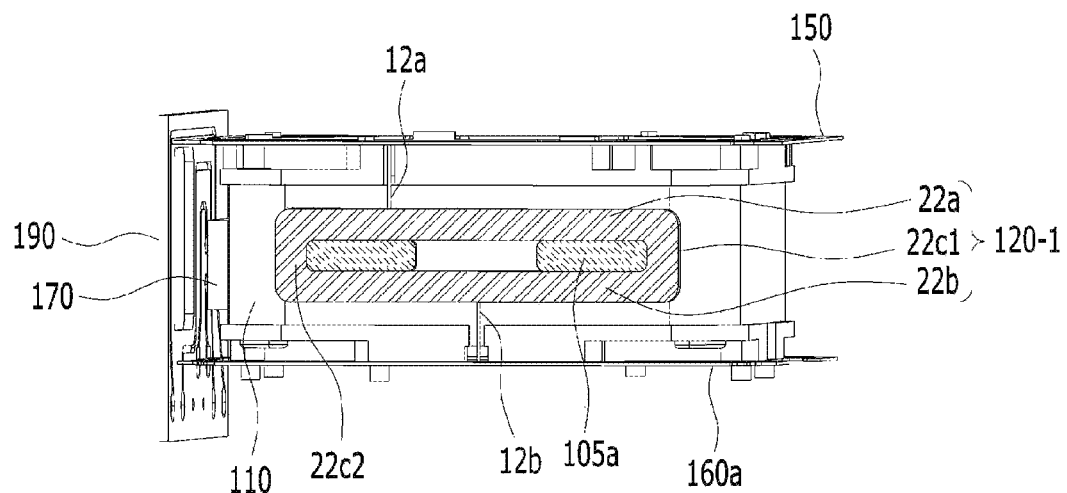
FIG. 7 is a side view illustrating a first coil, an upper elastic member, and a lower elastic member, which are coupled to the bobbin.
Figure 8:
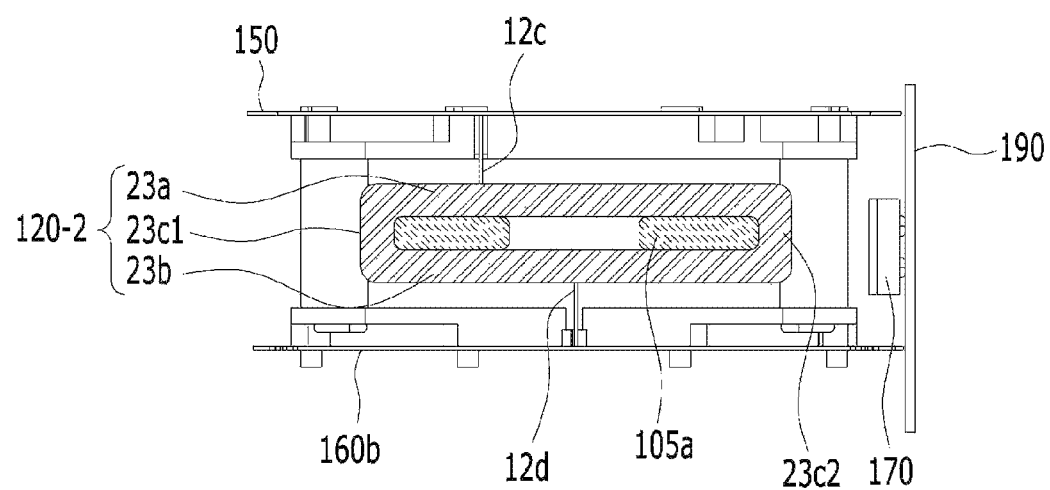
FIG. 8 is another side view illustrating a second coil, the upper elastic member and the lower elastic member, which are coupled to the bobbin.
Figure 9:
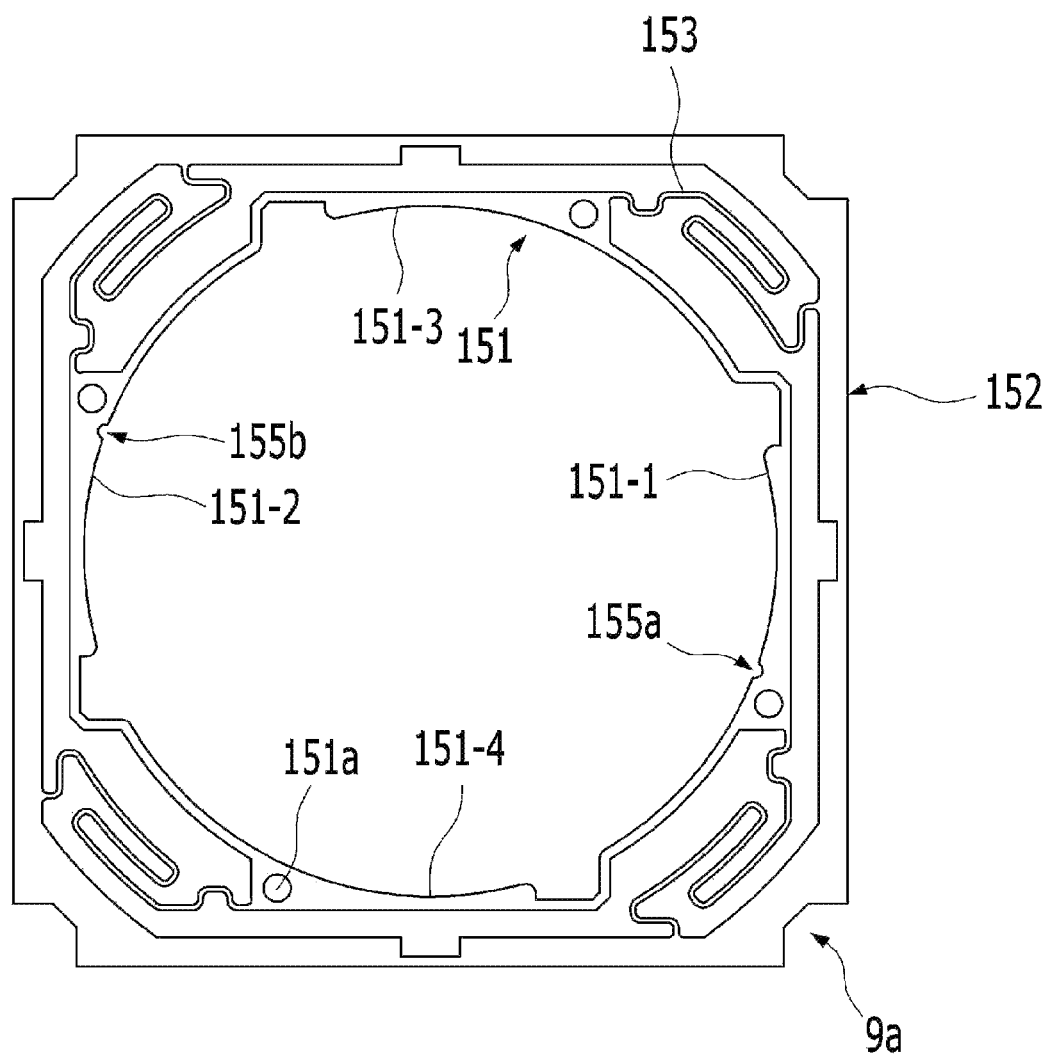
FIG. 9 is a view illustrating the upper elastic member.
Figure 10:
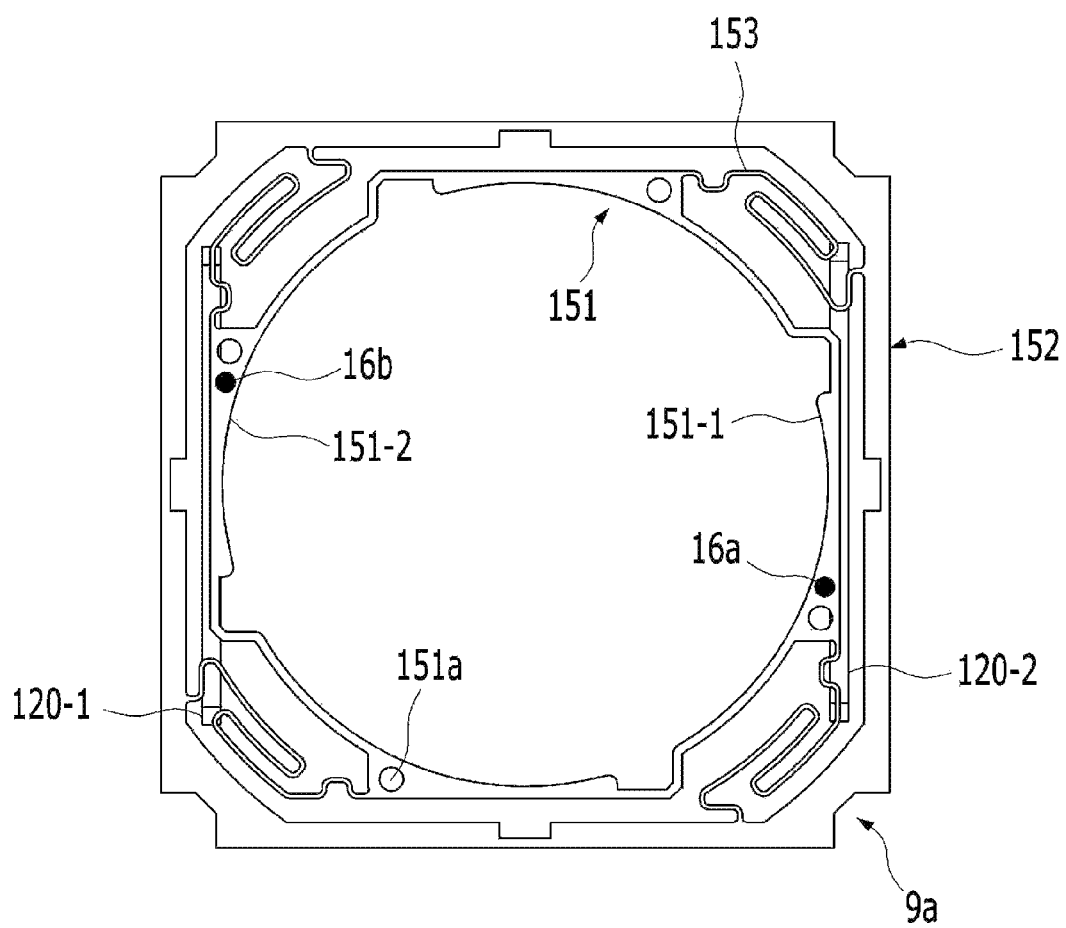
FIG. 10 is a view illustrating the connection between the upper elastic member and the first and second coils.
Figure 11:
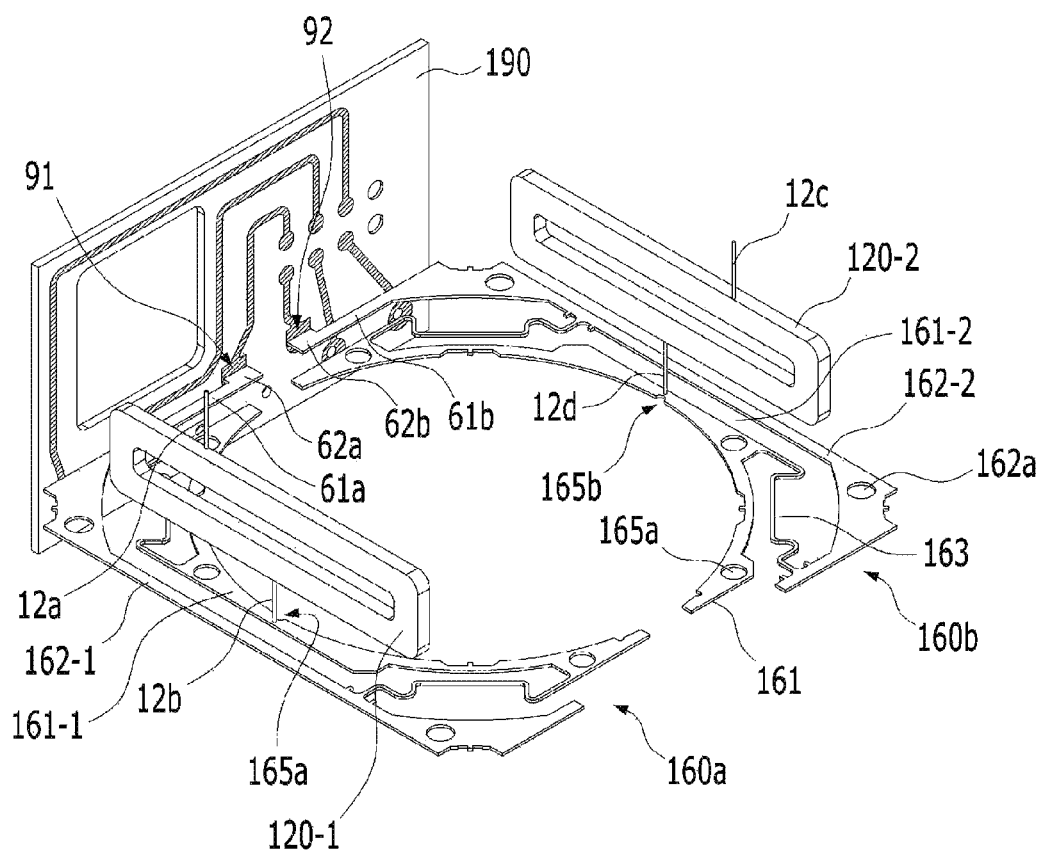
FIG. 11 is a view illustrating the connection between the circuit board and the first and second lower elastic units and the connection between the first and second lower elastic units and the first and second coils.
Figure 12:
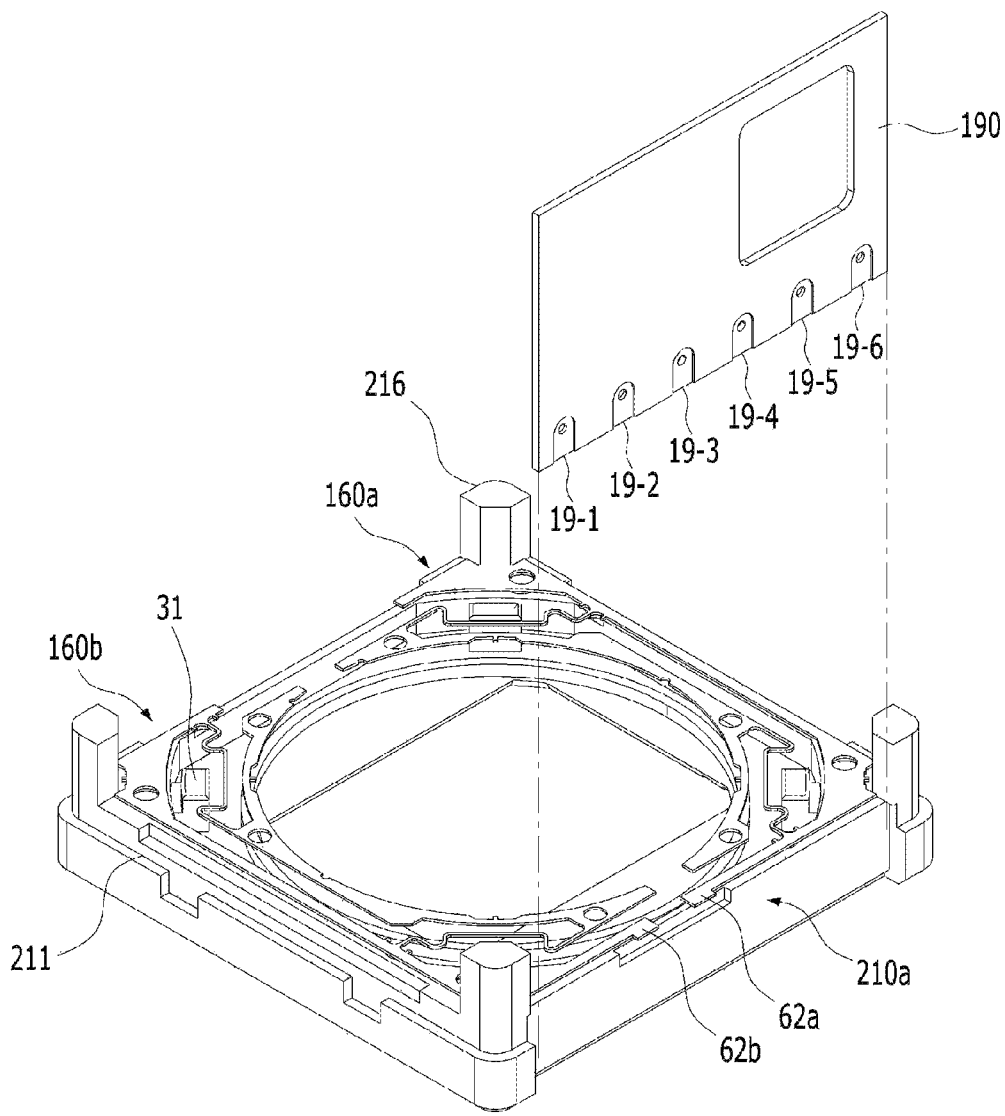
FIG. 12 is a view illustrating the lower elastic member, the base and the circuit board.
Figure 13:
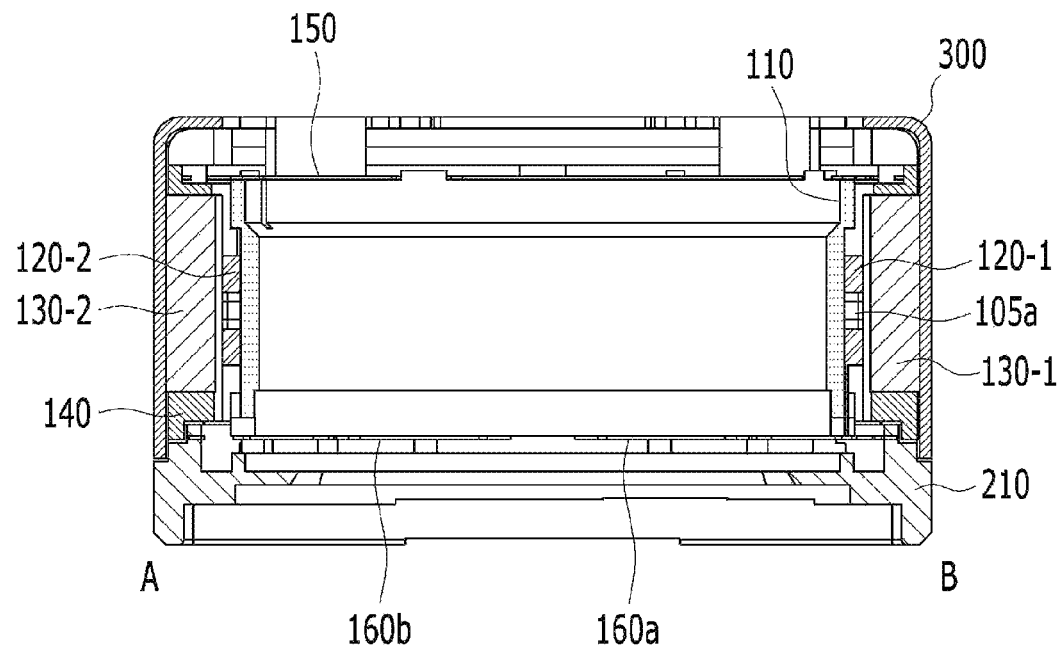
FIG. 13 is a cross-sectional view of the lens moving apparatus taken along line A-B in FIG. 2.
Figure 14:
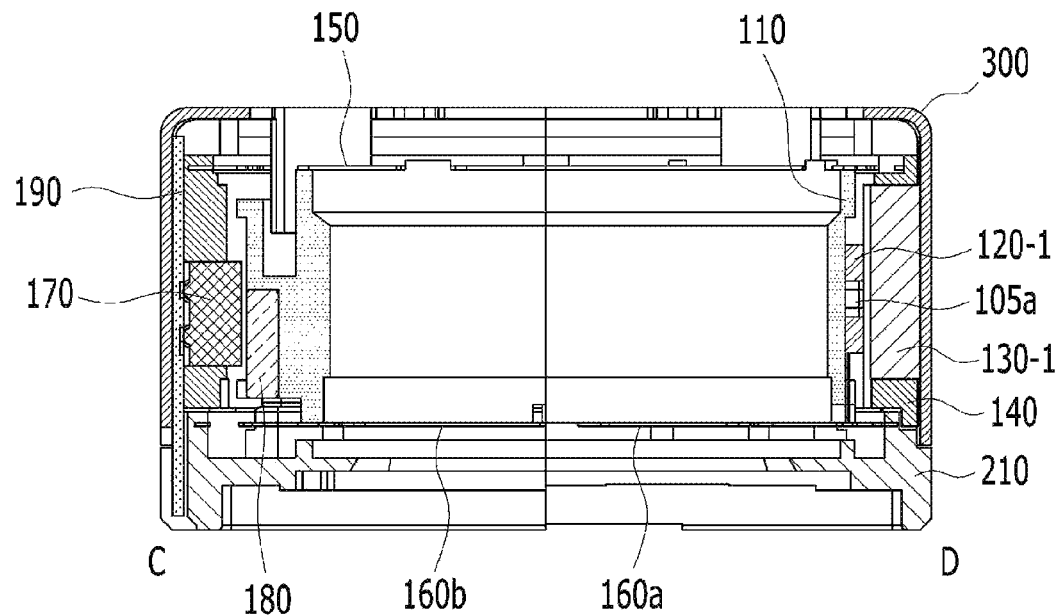
FIG. 14 is a cross-sectional view of the lens moving apparatus taken along line C-D in FIG. 2.

FIG. 7 is a side view illustrating the first coil 120-1, the upper elastic member 150 and the lower elastic member 160, which are coupled to the bobbin 110. FIG. 8 is a side view illustrating the second coil 120-2, the upper elastic member 150 and the lower elastic member 160, which are coupled to the bobbin 110. FIG. 9 is a view illustrating the upper elastic member 150. FIG. 10 is a view illustrating the connection between the upper elastic member 150 and the first and second coils 120-1 and 120-2. FIG. 11 is a view illustrating the connection between the circuit board 190 and the first and second lower elastic units 160a and 160b and the connection between the first and second lower elastic units 160a and 160b and the first and second coils 120-1 and 120-2. FIG. 12 is a view illustrating the lower elastic member 160, the base 210 and the circuit board 190. FIG. 13 is a cross-sectional view of the lens moving apparatus 100 shown in FIG. 2, taken along line A-B. FIG. 14 is a cross-sectional view of the lens moving apparatus 100 shown in FIG. 2, taken along line C-D.

Referring to FIGS. 7 and 14, each of the upper elastic member 150 and the lower elastic member 160 is coupled both to the bobbin 110 and to the housing 140 so as to support the bobbin 110.

For example, the upper elastic member 150 may be coupled both to the upper portion, the upper surface or the upper end of the bobbin 110 and to the upper portion, the upper surface or the upper end of the housing 140, and the lower elastic member 160 may be coupled both to the lower portion, the lower surface or the lower end of the bobbin 110 and to the lower portion, the lower surface or the lower end of the housing 140.

At least one of the upper and lower elastic members 150 and 160 may be divided or separated into two or more.

The upper elastic member 150 may include an upper elastic unit connecting the first coil 120-1 to the second coil 120-2. Although the upper elastic member 150 is illustrated in FIG. 9 as having a single upper elastic unit, which is not divided, the disclosure is not limited thereto.

In another embodiment, the upper elastic member may include a plurality of upper elastic units, and one of the plurality of upper elastic units may connect the first coil 120-1 to the second coil 120-2.

The lower elastic member 160 may include a first lower elastic unit 160a and a second lower elastic unit 160a. Here, the term "elastic unit" may be interchanged with "spring".

Although each of the upper elastic member 150 and the lower elastic member 160 may be embodied as a leaf spring, the disclosure is not limited thereto. Each of the upper and lower elastic members 150 and 160 may be embodied as a coil spring, a suspension wire or the like.

The upper elastic member 150 may include a first inner frame 151 coupled to the upper portion, the upper surface or the upper end of the bobbin 110, a first outer frame 152 coupled to the upper portion, the upper surface or the upper end of the housing 140, and a first frame connector 153 connecting the first inner frame 151 to the first outer frame 152. Here, the term "inner frame" may be interchangeably used with "inner portion", and the term "outer frame" may be interchangeably used with "outer portion".

The first inner frame 151 of the upper elastic member 150 may have formed therein a hole 151a, which is coupled to the first coupling portion 113 of the bobbin 110, and the first outer frame 152 may have formed therein a hole (not shown), which is coupled to the first coupler of the housing 140.

For example, the first inner frame 151 may include a first frame 151-1, disposed on the first side portion 110b-1 of the bobbin 110, and a second frame 151-2, disposed on the second side portion 110b-2 of the bobbin 110.

For example, the first inner frame 151 may include a third frame 151-3, which is disposed on the third side portion 110b-3 of the bobbin 110 so as to connect one end of the first frame 151-1 to one end of the second frame 151-2, and a fourth frame 151-4, which is disposed on the fourth side portion 110b-4 of the bobbin 110 so as to connect the other end of the first frame 151-1 to the other end of the second frame 151-2. Here, the first to fourth frames of the first inner frame 151 may be alternatively referred to as "first to fourth portions" or "first to fourth regions".

For example, the upper elastic member 150 may include four first frame connectors 153. Each of the four first frame connectors 153 may connect a corresponding one of the first to fourth frames 151-1 to 151-4 to a corresponding one of four different regions of the first outer frame 152. For example, each of the four first frame connectors 153 may be correspondingly positioned at the first to fourth corner portions 142-1 to 142-4 of the housing 140, respectively.

Each of the corners of the first outer frame 152 of the upper elastic member 150 may be provided with an escape groove 9a for avoiding spatial interference with the stopper 143 of the housing 140.

The first and second lower elastic units 160a and 160b may be coupled to the bobbin 110.

Alternatively, the first and second lower elastic units 160a and 160b may be coupled both to the bobbin 110 and to the housing 140.

The first and second lower elastic units 160a and 160b may be disposed between the bobbin 110 and the base 210.

At least one of the first and second lower elastic units 160a and 160b may include the second inner frame 161-1, 161-2 coupled to the lower portion, the lower surface or the lower end of the bobbin 110, the second outer frame 162-1, 162-2 coupled to the lower portion, the lower surface or the lower end of the housing 140, and the second frame connector 163, connecting the second inner frame 161 to the second outer frame 162.

The second inner frame 161 of at least one of the first and second lower elastic units 160a and 160b may have formed therein a hole 161a for coupling the second coupling portion 117 of the bobbin 110 using solder or a conductive adhesive member.

The second outer frame 162 of at least one of the first and second lower elastic units 160a and 160b may have formed therein a hole 162a for coupling the second coupler 147 of the housing 140.

For example, the second inner frame of the first lower elastic unit 160a may include the first frame 161-1, disposed on the lower portion or the lower surface of the first side portion 110b-1 of the bobbin 110.

For example, the second inner frame of the second lower elastic unit 160b may include the second frame 161-2, disposed on the lower portion or the lower surface of the second side portion 110b-2 of the bobbin 110.

Here, the first and second frames 161-1 and 161-2 of the second inner frame 161 may be alternatively referred to as "first and second portions" or "first and second regions".

Referring to FIG. 7, the first coil 120-1 may include a first portion 22a, disposed on the first side surface 110b-1 of the bobbin 110, and a second portion 22b, disposed under the first portion 22a.

The first coil 120-1 may further include a third portion 22c1 connecting one end of the first portion 22a to one end of the second portion 22b, and a fourth portion 22c2, connecting the other end of the first portion 22a to the other end of the second portion 22b. Here, the third portion 22c1 may be interchanged with a first curved portion or a first connector, and the fourth portion 22c2 may be interchanged with a second curved portion or a second connector.

Referring to FIG. 8, the second coil 120-2 may include a first portion 23a, disposed on the second side surface 110b-2 of the bobbin 110, and a second portion 23b, disposed under the first portion 23a.

The protrusion 105a, which is provided at the first side portion 110b-1 of the bobbin 110, may be disposed between the first portion 22a and the second portion 22b of the first coil 120-1, and the protrusion 105a, which is provided at the second side portion 110b-2 of the bobbin 110, may be disposed between the first portion 23a and the second portion 23b of the second coil 120-2.

The second coil 120-2 may further include a third portion 23c1, connecting one end of the first portion 23a to one end of the second portion 23b, and a fourth portion 23c2 connecting the other end of the first portion 23a to the other end of the second portion 23b.

Here, each of the first portions 22a and 23b may be alternatively referred to as a "first linear portion" or "upper portion", and each of the second portions 22b and 23b may be alternatively referred to as a "second linear portion" or "lower portion".

Here, each of the third portions 22c1 and 23c1 may be alternatively referred to as a "first curved portion" or a "first connection portion", and each of the fourth portions 22c2 and 23c2 may be alternatively referred to as a "second curved portion" or "second connection portion"

The first portion 22a of the first coil 120-1 may be connected to a region of the upper elastic member 150 (or the upper elastic unit), and the second portion 22b of the first coil 120 may be connected to the first lower elastic unit 160a.

The first portion 23a of the second coil 120-2 may be connected to another region of the upper elastic member 150 (or the upper elastic unit), and the second portion 23b of the second coil 120-2 may be connected to the second lower elastic unit 160b.

For example, one end of the first portion 22a of the first coil 120-1 may be connected to the first frame 151-1 of the first inner frame 151 using solder or a conductive member 16a, and the second portion 22b of the first coil 120-1 may be connected to the first frame 161-1 of the first lower elastic unit 160a using solder or a conductive member 16b.

For example, one end of the first portion 23a of the second coil 120-2 may be connected to the second frame 151-2 of the first inner frame 151 of the upper elastic unit, and the second portion 23b of the second coil 120-2 may be connected to the second frame 161-2 of the second lower elastic unit 160b.

For example, the first coil 120-1 may include a first extended line (or a first connecting line) 12a connecting the first portion 22a to the first frame 151-1 of the upper elastic member 150, and a second extended line (or a second connecting line) 12b connecting the second portion 22b to the first frame 161-1 of the second inner frame of the first lower elastic unit 160a.

For example, the second coil 120-2 may include a third extended line (or a third connecting line) 12c connecting the first portion 23a to the second frame 151-2 of the upper elastic member 150, and a fourth extended line (or a fourth connecting line) 12c connecting the second portion 22b to the second frame 161-2 of the second inner frame of the second lower elastic unit 160b.

As illustrated in FIG. 3, the upper end of the first side portion 110b-1 of the bobbin 110 may be provided therein with a first guide groove 10a for guiding the first connecting line 12a to the first frame 151-1 of the first inner frame 151, and the lower end of the first side portion 110b-1 of the bobbin 110 may be provided therein with a second guide groove 10b for guiding the second connecting line 12b to the first frame 161-1 of the second inner frame.

Furthermore, the upper end of the second side portion 110b-2 of the bobbin 110 may be provided therein with a third guide groove 10c for guiding the third connecting line 12c to the second frame 151-2 of the first inner frame 151, and the lower end of the second side portion 110b-2 of the bobbin 110 may be provided therein with a fourth guide groove 10d for guiding the fourth connecting line 12d to the second frame 161-2 of the second inner frame.

As illustrated in FIG. 9, the first inner frame 151 of the upper elastic member 150 (or the upper elastic unit) may include a first bonding portion 155a, to which the one end (or the first connecting line 12a) of the first coil 120-1 is coupled, and a second bonding portion 155b, to which the one end (or the third connecting line 12c) of the second coil 120-2 is coupled.

For example, the first bonding portion 155a may be provided at the first frame 151-1 of the first inner frame 151, and the second bonding portion 155b may be provided at the second frame 151-2 of the first inner frame 151.

The second inner frame of the first lower elastic unit 160a may be provided with a first bonding portion 165a, to which the other end or the second connecting line 12b of the first coil 120-1 is coupled.

For example, the first bonding portion 165a may be disposed on the first frame 161-1 of the second inner frame of the first lower elastic unit 160a. For example, the first bonding portion 165a may be provided therein with a groove, by which the second connecting line 12b is guided or in which the second connecting line 12b is fitted. The second connecting line 12b may be coupled to the first bonding portion 165a using solder or a conductive adhesive.

The second outer frame of the first lower elastic unit 160a may be provided with a second bonding portion 62a, to which a first connecting terminal (or a first terminal) 91 of the circuit board 190 is coupled.

For example, the second outer frame 162-1 of the first lower elastic unit 160a may be disposed on the first side portion 141-1, the first corner portion 142-1, the fourth corner portion 142-4 and the fourth side portion 141-4 of the housing 140, and the second bonding portion 62a may be disposed on one end of the second outer frame 162-1 of the first lower elastic unit 160a disposed on the fourth side portion 141-4 of the housing 140.

For example, the second outer frame 162-1 of the first lower elastic unit 160a may include a first extended portion 61a, which extends toward the fourth side portion from the fourth corner portion of the housing 140, and the second bonding portion 62a may be provided at one end of the first extended portion 61a.

For example, the second bonding portion 62a may be positioned at the lower surface of the fourth side portion 141-4 of the housing 140 or below the lower portion of the fourth side portion 141-4 of the housing 140. For example, the second bonding portion 61b may project toward the circuit board 190 from the outer surface of the second outer frame of the first lower elastic unit 160a positioned at the fourth side portion 141-4, so as to be easily coupled to the first connection terminal 91 of the circuit board 190.

The second inner frame of the second lower elastic unit 160b may be provided with a third bonding portion 165b to which the other end or the fourth connecting line 12d of the second coil 120-2 is coupled. For example, the third bonding portion 165b may be disposed on the second frame 161-2 of the second inner frame of the second lower elastic unit 160b. For example, the third bonding portion 165b may be provided therein with a groove, by which the fourth connecting line 12d is guided or in which the fourth connecting line 12d is fitted. The fourth connecting line 12d may be coupled to the third bonding portion 165b using solder or a conductive adhesive.

The second outer frame 162-2 of the second lower elastic unit 160b may be provided with a fourth bonding portion 62b, to which the second connecting terminal (or the second terminal) 92 of the circuit board 190 is coupled.

For example, the second outer frame 162-2 of the second lower elastic unit 160b may be disposed on the second side portion 141-2, the second corner portion 142-2, the third corner portion 142-2 and the fourth side portion 141-4 of the housing 140, and the fourth bonding portion 62b may be disposed on one end of the second outer frame 162-2 of the second lower elastic unit 160b disposed on the fourth side portion 141-4 of the housing 140.

For example, the second outer frame 162-2 of the second lower elastic unit 160b may include the second extended portion 61b, which extends toward the fourth side portion 141-1 from the third corner portion 142-3 of the housing 140, and the fourth bonding portion 62b may be provided at one end of the second extended portion 61b. The second extended portion 61b may be spaced apart from the first extended portion 61a.

For example, the fourth bonding portion 62b may be spaced apart from the second bonding portion 62a, and may be disposed on one end of the second outer frame 162 of the second lower elastic unit 160a adjacent to the fourth side portion 141-4 of the housing 140.

For example, the fourth bonding portion 62b may be positioned at the lower surface of the fourth side portion 141-4 of the housing 140 or below the lower portion of the fourth side portion 141-4 of the housing 140. For example, the fourth bonding portion 62b may project toward the circuit board 190 from the outer surface of the second outer frame of the second lower elastic unit 160b positioned at the fourth side portion 141-4 so as to be easily coupled to the second connection terminal 92 of the circuit board 190.

The first coil 120-1 and the second coil 120-2 may be connected to each other in series via the upper elastic member 150, and the circuit board 190 may be conductively connected to the first and second coils 120-1 and 120-2 via the first lower elastic unit 160a and the second lower elastic unit 160b.

One drive signal may be provided to the first coil 120-1 and the second coil 120-2 via the circuit board 190, the first and second lower elastic units 160a and 160b, and the upper elastic member 150.

When the position sensor 170 includes only a hall sensor, the position sensor 170 may include two input terminals and two output terminals. The four terminals of the position sensor 170 may be conductively connected to four terminals (for example, 19-1 to 19-4) among the six terminals 19-1 to 19-6 of the circuit board 190.

The two remaining terminals 19-5 and 19-6 of the circuit board 190 may receive a drive signal, which is provided to the first and second coils 120-1 and 120-2 from the outside. The two terminals 19-5 and 19-6 may be conductively connected to the first and second connection terminals 91 and 92, and a drive signal may be provided to the first and second coils via the first and second connection terminals 91 and 92.

When the position sensor 170 includes a hall sensor and a driver, as illustrated in FIG. 15, the position sensor 170 may include the six terminals as described above. The first to fourth terminals of the position sensor 170 may be conductively connected to the four terminals of the circuit board 190 so as to send or receive a clock signal SCL, a data signal SDA and power signals VCC and GND.

The fifth and sixth terminals of the position sensor 170 may be conductively connected to the first and second connection terminals 91 and 92 of the circuit board 190, and the position sensor 170 may provide a drive signal to the first and second coils 120-1 and 120-2 via the first and second connection terminals 91 and 92.

Each of the first frame connector 153 and the second frame connector 163 of the upper elastic member 150 and the lower elastic member 160 may be bent or curved (or may be formed into a curved line) at least once so as to define a predetermined pattern. The upward and/or downward movement of the bobbin 110 in the first direction may be flexibly (or elastically) supported through changes in position and fine deformation of the first and second frame connectors 153 and 163.

In order to absorb and dampen vibrations of the bobbin 110, the lens moving apparatus 100 may further include a damper (not shown) disposed between the upper elastic member 150 and the housing 140.

For example, the damper (not shown) may be disposed in the space between the first frame connector 153 of the upper elastic member 150 and the bobbin 110 (and/or the housing 140).

For example, the damper (not shown) may be disposed in the space between the damper protrusion 25a of the bobbin 110 and the first frame connector 153 of the upper elastic member 150.

For example, the lens moving apparatus 100 may further include a damper (not shown) disposed between the second frame connectors 163 of each of the first and second lower elastic units 160a and 160b and the bobbin 110 (and/or the housing 140).

For example, a damper (not shown) may also be disposed between the inner surface of the housing 140 and the outer surface of the bobbin 110.

Next, the base 210 will be described.

Referring to FIG. 12, the base 210 may have an opening corresponding to the bore in the bobbin 110 and/or the bore in the housing 140, and may have a shape corresponding to or coinciding with that of the cover member 300, for example, a square shape.

The base 210 may include a step 211 at the lower end of the side surface thereof, to which an adhesive is applied when the cover member 300 is secured to the base 210 via adhesion. Here, the step 211 may guide the cover member 300, which is coupled to the upper side of the base, and may face the lower end of the side plate of the cover member 300. An adhesive member and/or a sealing member may be disposed or applied between the lower end of the side plate of the base 210 and the step 211 of the base 210.

The base 210 may be disposed below the bobbin 110 and the housing 140.

For example, the base 210 may be disposed below the lower elastic member 160.

The projection 216, which corresponds to the guide groove 148 in the housing 140, may be provided at a corner of the upper surface of the base 210. Although the projection 216 may have the form of a polygonal column, which projects perpendicularly from the upper surface of the base 210, the disclosure is not limited thereto.

The projection 216 may be fitted into the guide groove 148 in the housing 140, and may be fastened or coupled to the guide groove 148 using an adhesive member (not shown) such as epoxy or silicone.

The base 210 may include stoppers 231 projecting from the upper surface thereof.

Although the stoppers 231 may be disposed so as to correspond to the projections 216, the disclosure is not limited thereto. The stoppers 231 may be disposed on positions corresponding to the second frame connector 163 of the first and second lower elastic units 160a and 160b.

In order to avoid spatial interference between the bobbin 110 and the lower elastic member 160, the stoppers 231 of the base 210 may be positioned higher than the second frame connectors 163 of the lower elastic units 160a and 160b coupled to the base 210. The stoppers 231 of the base 210 are able to prevent the lower surface or the lower end of the bobbin 210 from directly colliding with the upper surface of the base 210 when an external impact occurs.

The base 210 may include a seating groove 210a formed in the side surface corresponding to the side portion (for example, 141-4) of the housing 140, at which the circuit board 190 is disposed, so as to allow the lower end of the circuit board 190 to be seated in the seating groove 210a.

For example, the terminals 19-1 to 19-6 of the circuit board 190 may be disposed on the lower end of the second surface of the circuit board 190, and may be positioned in the seating groove 210a.

Next, the cover member 300 will be described.

The cover member 300 accommodates other components 110, 120-1, 120-2, 130-1, 130-2, 140, 150, 160a, 160b, 170, 180 and 190 in the space defined between the cover member 300 and the base 210.

The cover member 300 may be configured to have a box shape, which is open at the lower face thereof and includes the upper plate and the side plates. The lower ends of the side plates of the cover member 300 may be coupled to the upper portion of the base 1210. The upper plate of the cover member 300 may have a polygonal shape, for example, a square shape, an octagonal shape, or the like. The upper plate of the cover member 300 may have a bore through which a lens (not shown) is exposed to external light.

The cover member 300 may be made of a nonmagnetic material such as stainless steel or plastic in order to prevent the cover member 300 from being attracted to the magnet 130. However, the cover member 300 may alternatively be made of a magnetic material so as to serve as a yoke.

At the initial position of the bobbin 110, at least a portion of the first coil 120-1 disposed on the first side portion 110b-1 of the bobbin 110 may overlap the first magnet 130-1, which is disposed on the housing 140 so as to face toward the second side portion 141-2 from the first side portion 141-1 of the housing 140.

At the initial position of the bobbin 110, at least a portion of the second coil 120-2 disposed on the second side portion 110b-2 of the bobbin 110 may overlap the second magnet 130-2, which is disposed on the bobbin 110 so as to face toward the second side portion 141-2 from the first side portion 141-1 of the housing 140.

Although FIGS. 1 to 14 illustrate an embodiment in which the upper elastic member 150 includes one upper elastic unit connecting the first coil 120-1 to the second coil 120-2 while the lower elastic member 160 includes two lower elastic units 160a and 160b connected to the circuit board 190, the disclosure is not limited thereto.

In another embodiment, the lower elastic member may include one lower elastic unit connecting the first coil 120-1 to the second coil 120-2, and the upper elastic member may include two upper elastic units conductively connected to the circuit board 190.

In this case, the description regarding the conductive connection between the first and second coils and the upper elastic member 150, which are illustrated in FIGS. 9 to 11, may be identically or similarly applied to the conductive connection between the lower elastic member including one lower elastic unit and the first and second coils.

Furthermore, in this case, the description regarding the conductive connection between the circuit board 190 and the first and second lower elastic units 160a and 160b, which are illustrated in FIGS. 9 to 11, may be identically or similarly applied to the conductive connection between two upper elastic units and the circuit board 190.

Because magnetic-field interference may occur between the magnets of two lens moving apparatuses included in a dual camera module, the reliability of AF operation or OIS operation may be deteriorated. Although the distance between the two lens moving apparatuses must be about 10 mm or more in order to reduce such magnetic-field interference, the distance between the lenses mounted in the lens moving apparatuses must be decreased in order to realize a zoom function. Accordingly, there is a need to provide a structure capable of reducing magnetic-field interference even when the distance between the two lens moving apparatuses is decreased.

The embodiment is capable of reducing such magnetic-field interference in the dual camera module by including two coils 120-1 and 120-2, which are wound in a direction parallel to the direction of a magnetic field, and two magnets 130-1 and 130-2 corresponding to the two coils 120-1 and 120-2 for AF operation.

Furthermore, since the embodiment includes two magnets each having a bipolar magnetized structure, the embodiments are capable of reducing leakage of magnetic flux and thus increasing electromagnetic force.

Since two AF coils 120-1 and 120-2 are disposed on the bobbin 110 and two corresponding magnets 130-1 and 130-2 are disposed on the housing 140, the embodiment is capable of simplifying the structure of the lens moving apparatus and of reducing the size of the lens moving apparatus.

Furthermore, since the first and second coils 120-1 and 120-2 are connected to the upper elastic member 150 via soldering, the embodiment is capable of preventing disconnection of the first and second coils 120-1 and 120-2 and of preventing the first and second coils 120-1 and 120-2 from being separated from the bobbin 110.

Meanwhile, the lens moving apparatuses according to the above-described embodiments may be used in various fields, such as, for example, those of a camera module or an optical device.

For example, the lens moving apparatus 100 according to the embodiment may be included in an optical instrument, which is designed to form the image of an object in a space using reflection, refraction, absorption, interference, diffraction or the like, which are characteristics of light, to extend eyesight, to record an image obtained through a lens or reproduce the image, to perform optical measurement, or to propagate or transmit an image. For example, the optical instrument according to the embodiment may include a smart phone and a portable terminal equipped with a camera.

Figure 16:
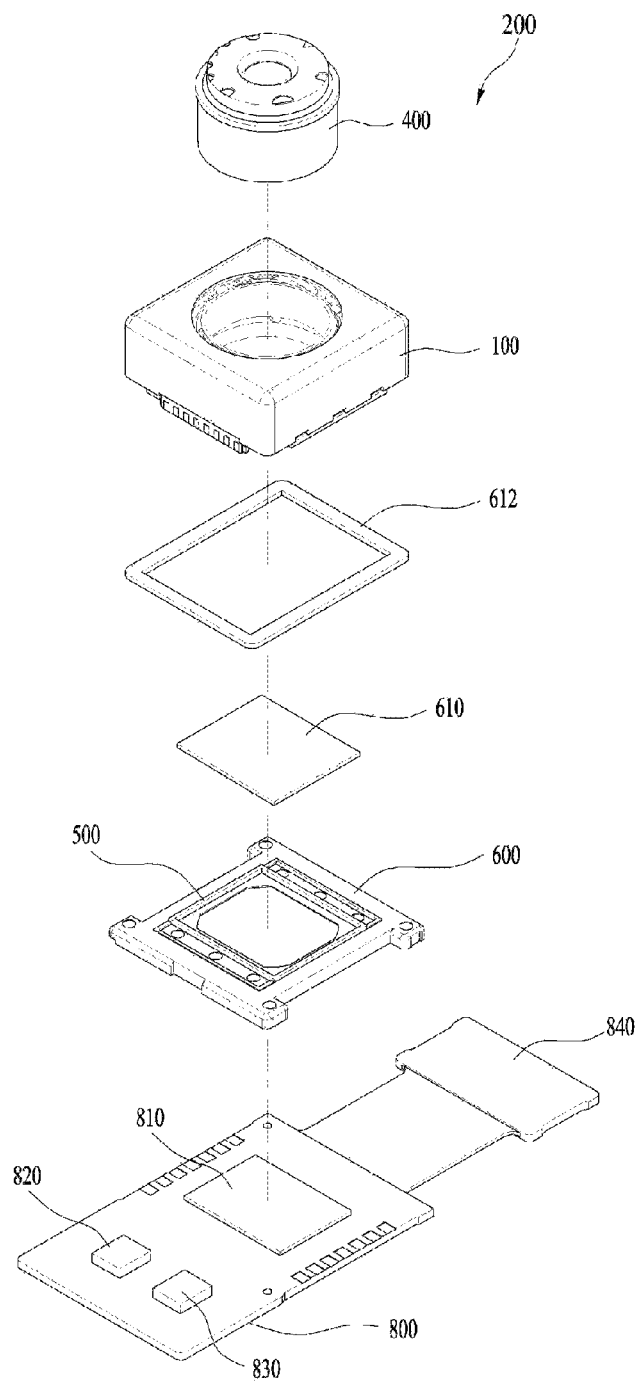
FIG. 16 is an exploded perspective view illustrating a camera module according to an embodiment.

FIG. 16 is an exploded perspective view illustrating a camera module 200 according to an embodiment.

Referring to FIG. 16, the camera module 200 may include a lens or a lens module 400, the lens moving apparatus 100, an adhesive member 612, a filter 610, a first holder 600, a second holder 800, an image sensor 810, a motion sensor 820, a controller 830 and a connector 840.

The lens or the lens barrel 400 may be mounted in the bobbin 110 of the lens moving apparatus 100.

The first holder 600 may be disposed under the base 210 of the lens moving apparatus 100. The filter 610 may be mounted on the first holder 600, and the first holder 600 may include a projection 500 on which the filter 610 is seated.

The adhesive member 612 may couple or attach the base 210 of the lens moving apparatus 100 to the first holder 600. In addition to the attachment function described above, the adhesive member 612 may serve to prevent contaminants from entering the lens moving apparatus 100.

For example, the adhesive member 612 may be, for example, epoxy, thermohardening adhesive, or ultraviolet hardening adhesive.

The filter 610 may serve to prevent light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

The region of the first holder 600 in which the filter 610 is mounted may be provided with a bore in order to allow the light that passes through the filter 610 to be introduced into the image sensor 810.

The second holder 800 may be disposed under the first holder 600, and the image sensor 810 may be mounted on the second holder 600. The image sensor 810 may be the region, on which an image included in the light that passes through the filter 610 and is introduced thereinto is formed.

The second holder 800 may include, for example, various circuits, devices, and a controller in order to convert the image, formed on the image sensor 810, into electrical signals and to transmit the electrical signals to an external component.

The second holder 800 may be embodied as a circuit board on which the image sensor 810 may be mounted, on which a circuit pattern may be formed, and to which various devices may be coupled.

The image sensor 810 may receive an image included in light, which is introduced through the lens moving apparatus 100, and may convert the received image into an electric signal.

The filter 610 and the image sensor 810 may be spaced apart from each other so as to be opposite each other in the first direction.

The motion sensor 820 may be mounted on the second holder 800, and may be conductively connected to the controller 830 through the circuit pattern formed on the second holder 800.

The motion sensor 820 may output rotational angular speed caused by motion. The motion sensor 820 may be embodied as a dual-axis or triple-axis gyro sensor or an angular speed sensor.

The controller 830 may be mounted on the second holder 800. The second holder 800 may be conductively connected to the lens moving apparatus 100. For example, the second holder 800 may be conductively connected to the circuit board 190 of the lens moving apparatus 100.

For example, a drive signal may be supplied to the position sensor 170 through the second holder 800, and the signal output from the position sensor 170 may be transmitted to the second holder 800. For example, the signal output from the position sensor 170 may be received by the controller 830.

The connector 840 may be conductively connected to the second holder 800, and may have therein a port that is intended to be conductively connected to an external device.

Figure 17:
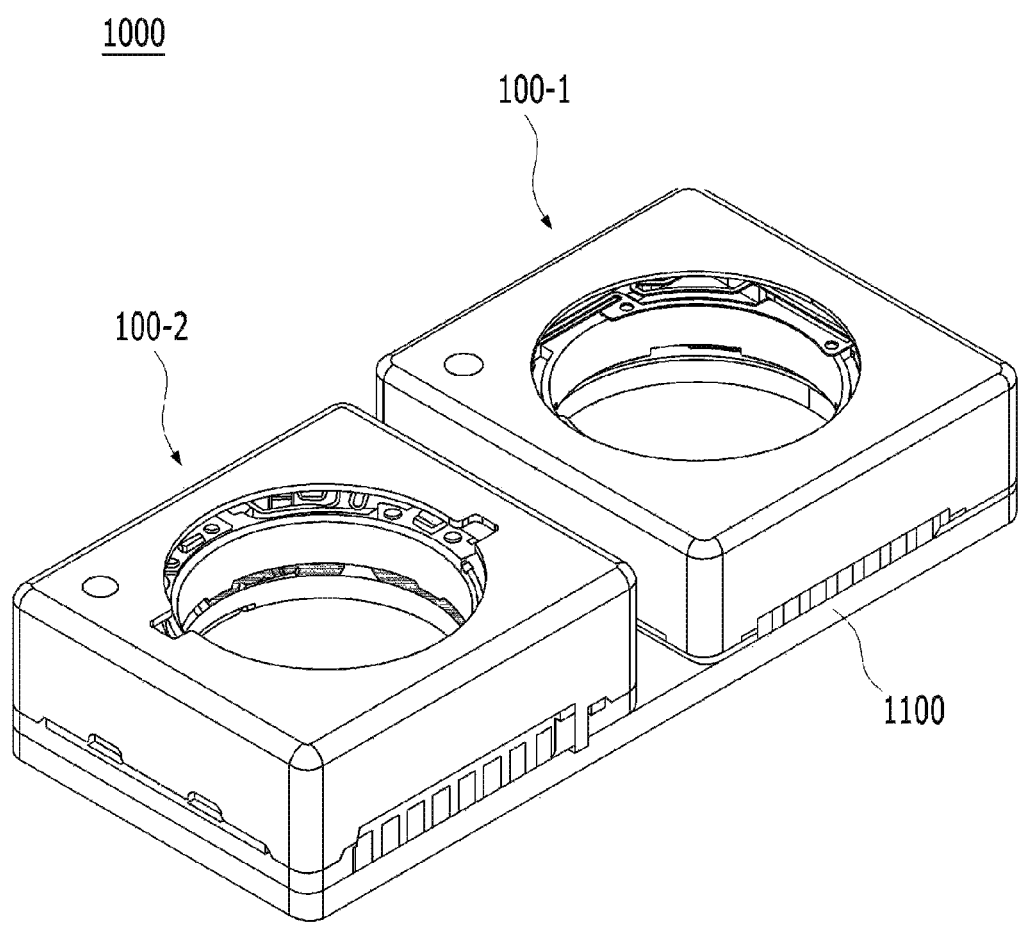
FIG. 17 is an exploded perspective view illustrating a camera module according to another embodiment.

FIG. 17 is a perspective view of a camera module 1000 according to another embodiment.

Referring to FIG. 17, the camera module 1000 may be a dual camera module, which includes a first camera module 100-1 equipped with a first lens moving apparatus and a second camera module 100-2 equipped with a second lens moving apparatus.

Each of the first camera module 100-1 and the second camera module 100-2 may be one of an AF camera module and an OIS camera module.

The AF camera module is a camera module capable of performing only an autofocus function, and the OIS camera module is a camera module capable of performing both an autofocus function and an OIS function.

For example, the first lens moving apparatus 100-1 may be the lens moving apparatus 100 according to the embodiment shown in FIG. 1. For example, the second lens moving apparatus 200-2 may be the lens moving apparatus 100 shown in FIG. 1 or an OIS lens moving apparatus.

The camera module 1000 may further include a circuit board 1100 in order to mount the first camera module 100-1 and the second camera module 100-2 thereon.

Although FIG. 17 illustrates an embodiment in which the first camera module 100-1 and the second camera module 100-2 are disposed on the circuit board 1100 so as to be parallel to each other, the disclosure is not limited thereto. In another embodiment, the circuit board 1100 may include first and second circuit boards, which are separated from each other, such that the first camera module 100-1 is disposed on the first circuit board and the second camera module is disposed on the second circuit board.

By orienting the first camera module 100-1 such that the side portion (for example, 141-3 or 141-4) of the housing 140 of the first camera module 100-1, at which the first and second magnets 130-1 and 130-2 are not disposed, is positioned adjacent to the second lens moving apparatus 100-2, it is possible to reduce the magnetic-field interference between the first and second magnets 130-1 and 130-2 of the first camera module 100-1 and the magnets included in the second lens moving apparatus of the second camera module 100-2 and thus to ensure reliability of AF operation and/or OIS operation of each of the first camera module 100-1 and the second camera module 100-2.

Figure 18:
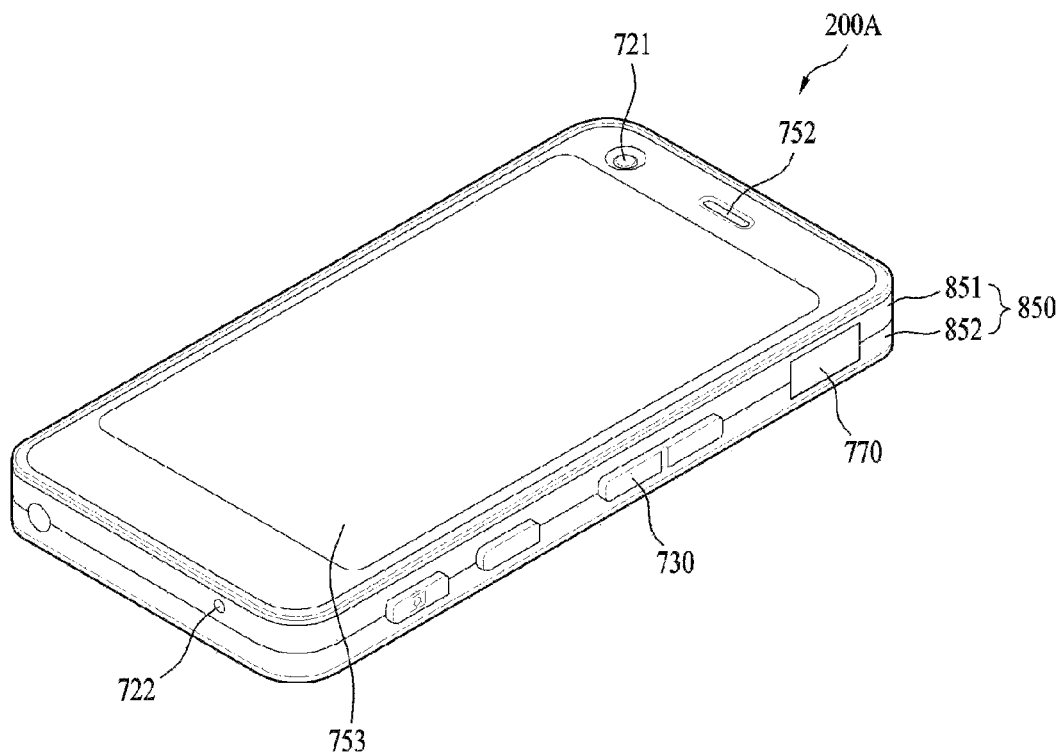
FIG. 18 is a perspective view of a portable terminal according to an embodiment.
Figure 19:
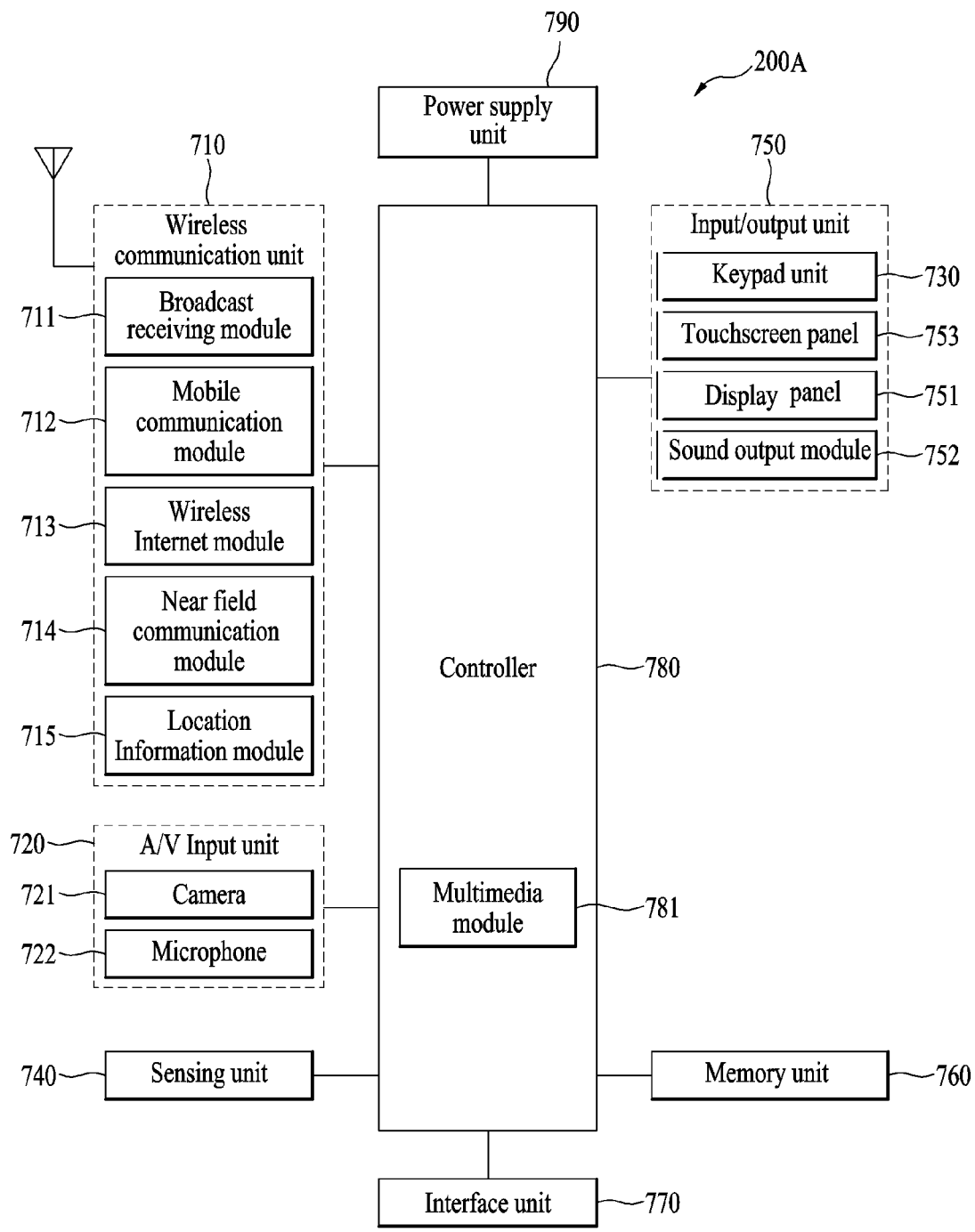
FIG. 19 is a view illustrating the configuration of the portable terminal illustrated in FIG. 18.

FIG. 18 is a perspective view illustrating a portable terminal 200A according to an embodiment. FIG. 19 is a view illustrating the configuration of the portable terminal 200A illustrated in FIG. 38.

Referring to FIGS. 18 and 19, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 18 has a bar shape, without being limited thereto, and may be any of various types, such as, for example, a slide type, a folder type, a swing type, or a swivel type, in which two or more sub-bodies are coupled so as to be movable relative to each other.

The body 850 may include a case (e.g. a casing, housing, or cover) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may include the camera module 200, 1000 according to the embodiment shown in FIG. 16 or 17.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies depending on the electrical signals applied thereto. For example, the display module 751 may include at least one among a liquid crystal display, a thin-film transistor liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 180, or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to such combinations and modifications should be construed as falling within the scope of the disclosure.

INDUSTRIAL APPLICABILITY

The embodiments are applicable to a lens moving apparatus and a camera module and an optical device including the same, which are capable of reducing magnetic-field interference, of increasing electromagnetic force, of preventing disconnection of the first and second coils and of preventing the first and second coils from being separated from the bobbin.

The invention claimed is:

1. A lens moving apparatus comprising:
    a housing;
    a bobbin disposed in the housing, the bobbin comprising first and second side portions positioned opposite to each other in a x-axis direction perpendicular to an optical axis direction and third and fourth side portions positioned opposite to each other in a y-axis direction perpendicular to the x-axis direction and the optical axis direction;
    a driving coil disposed on the bobbin, the driving coil comprising a ring shaped portion comprising a first coil disposed on the first side portion of the bobbin, and a second coil disposed on the second side portion of the bobbin;
    a driving magnet disposed on the housing;
    a first elastic member coupled to the bobbin;
    a second elastic member comprising a first elastic unit and a second elastic unit, which are coupled to the bobbin; and a circuit board disposed on the housing, the circuit board comprising first and second terminals, wherein the first elastic unit is spaced apart from the second elastic unit, wherein the ring shaped portion of the driving coil comprises:
- the first coil having a ring shape wound about an axis perpendicular to an outer surface of the first side portion of the bobbin; and
- the second coil having a ring shape wound about an axis perpendicular to an outer surface of the second side portion of the bobbin, wherein the first coil is electrically connected to the first elastic unit and the second coil is electrically connected to the second elastic unit, wherein the first elastic unit is connected to the first terminal of the circuit board, and the second elastic unit is connected to the second terminal of the circuit board, wherein the bobbin is configured to move in the optical axis direction by an interaction between the driving coil and the driving magnet, wherein the housing comprises a first side portion corresponding to the first side portion of the bobbin, a second side portion corresponding to the second side portion of the bobbin, and third and fourth side portions disposed between the first side portion and the second side portion of the housing, wherein the driving magnet comprises a first magnet disposed on the first side portion of the housing so as to face the first coil in the x-axis direction, and a second magnet disposed on the second side portion of the housing so as to face the second coil in the x-axis direction, wherein the circuit board overlaps the third and fourth side portions of the bobbin in the y-axis direction, and wherein the driving magnet is not disposed on the third and fourth side portions of the housing.

2. The lens moving apparatus according to claim 1, wherein the first elastic member comprises a first frame comprising a first portion connected to a first end of the first coil and a second portion connected to a first end of the second coil, wherein the first elastic unit comprises a second frame connected to a second end of the first coil, and wherein the second elastic unit comprises a third frame connected to a second end of the second coil.

3. The lens moving apparatus according to claim 1, wherein the first side portion of the bobbin is provided at a side surface thereof with at least one first protrusion to which the first coil is coupled, and the second side portion of the bobbin is provided at a side surface thereof with at least one second protrusion to which the second coil is coupled.

4. The lens moving apparatus according to claim 1, wherein the second coil comprises a first portion, a second portion disposed under the first portion, a third portion connecting a first end of the first portion to a first end of the second portion, a fourth portion connecting a second end of the first portion to a second end of the second portion, a third connecting line connecting the first portion to the first elastic member, and a fourth connecting line connecting the second portion to the second elastic unit.

5. The lens moving apparatus according to claim 1, further comprising:
- a sensing magnet disposed on the fourth side portion of the bobbin; and
- a position sensor disposed on the circuit board so as to face the sensing magnet, wherein the circuit board is disposed on the fourth side portion of the housing.

6. The lens moving apparatus according to claim 5, wherein the position sensor comprises a hall sensor and a driver and the circuit board is conductively connected to the position sensor, and wherein the position sensor provides the first and second elastic units with a drive signal for driving the driving coil, via the first and second terminals.

7. The lens moving apparatus according to claim 1, wherein the first elastic member is coupled to an upper portion of the bobbin, and the first and second elastic units are coupled to a lower portion of the bobbin.

8. The lens moving apparatus according to claim 1, wherein the first elastic member is coupled to a lower portion of the bobbin, and the first and second elastic units are coupled to an upper portion of the bobbin.

9. The lens moving apparatus according to claim 1, wherein the first coil and the second coil are connected to each other in series via the first elastic member.

10. The lens moving apparatus according to claim 1, wherein a drive signal is provided to the first coil and the second coil via the circuit board, the first and second elastic units, and the first elastic member.

11. The lens moving apparatus according to claim 1, wherein each of the first and second magnets is a bipolar magnetized magnet divided into two parts in a direction perpendicular to an optical axis.

12. The lens moving apparatus according to claim 1, further comprising a base disposed under the bobbin and the housing, wherein the circuit board is disposed on a side portion of the housing.

13. The lens moving apparatus according to claim 12, wherein the base comprises a groove formed in a side surface corresponding to the side portion of the housing on which the circuit board is disposed, and wherein a lower end of the circuit board is disposed in the groove of the base.

14. The lens moving apparatus according to claim 1, wherein the driving magnet is not disposed between the third side portion of the bobbin and the third side portion of the housing, and wherein the driving coil is not disposed between the fourth side portion of the bobbin and the fourth side portion of the housing.

15. The lens moving apparatus according to claim 1, wherein the circuit board is disposed on the third side portion or the fourth side portion of the housing.

16. The lens moving apparatus according to claim 1, wherein the ring shaped portion of the driving coil is not disposed on the third and fourth side portions of the bobbin.

17. The lens moving apparatus according to claim 1, wherein a first end of the first coil is coupled with a first region of the first elastic member via a solder or a conductive adhesive member, and a second end of the first coil is coupled with the first elastic unit via a solder or a conductive adhesive member, and wherein a first end of the second coil is coupled with a second region of the first elastic member via a solder or a conductive adhesive member and a second end of the second coil is coupled with the second elastic unit via a solder or a conductive adhesive member.

18. The lens moving apparatus according to claim 1, wherein the driving coil as a whole does not overlap the third and fourth side portions of the bobbin.

19. A camera module comprising:
a lens;
the lens moving apparatus according to claim 1; and
an image sensor.

* * * * *